United States Patent [19]
Dahlberg et al.

[11] 3,886,267

[45] May 27, 1975

[54] IRON PREPARATION SUITABLE FOR PARENTERAL INJECTION AND A PROCESS FOR THE PREPARATION THEREOF

[75] Inventors: Alf-Göran Dahlberg, Nykvarn; Karl Gustav Högberg, Sodertalje; Sven Lindvall, Sodertalje; Thore Oskar Verner Rydh, Sodertalje, all of Sweden

[73] Assignee: Astra Lakemedel Aktiebolag, Sodertalje, Sweden

[22] Filed: Oct. 4, 1972

[21] Appl. No.: 294,930

[30] Foreign Application Priority Data
Oct. 6, 1971 Sweden.............................. 12613/71

[52] U.S. Cl.................... 424/78; 424/147; 424/295
[51] Int. Cl.²......................................... A61K 27/00
[58] Field of Search....................... 424/78, 147, 295

[56] References Cited
UNITED STATES PATENTS

| | | | |
|---|---|---|---|
| 3,093,545 | 6/1963 | Westfall et al...................... | 424/147 |
| 3,563,978 | 2/1971 | Ochs..................................... | 424/78 |
| 3,592,889 | 7/1971 | Lindvall et al..................... | 424/147 |

*Primary Examiner*—Sam Rosen
*Attorney, Agent, or Firm*—Brumbaugh, Graves, Donohue & Raymond

[57] ABSTRACT

An iron-containing composition suitable for parenteral administration in human and veterinary medicine consisting essentially of an aqueous solution of a complex of iron, said complex containing iron bound to a physiologically innocuous, water swellable polymer which is the reaction product of i. at least one hydroxy carboxylic acid selected from the group consisting of arabonic acid, gluconic acid and glucoheptonic acid and salts and lactones derivable therefrom;

ii. at least one polyhydric alcohol selected from the class consisting of glycerol, polyglycerols, tetritols, pentitols, hexitols, heptitols, with alkyl groups containing from 1 to 5 carbon atoms partially etherified derivatives of said polyhydric alcohols, and with hydroxyalkyl groups containing from 1 to 5 carbon atoms partially etherified derivatives of said polyhydric alcohols; and iii. at least one polymerizing agent selected from the group consisting of dihalohydrins and epihalohydrins and diepoxides derivable therefrom, and mixtures thereof.

21 Claims, 4 Drawing Figures

FIG. 1 GEL FILTRATION

FIG. 2  GEL FILTRATION

IRON PREPARATION SUITABLE FOR PARENTERAL INJECTION AND A PROCESS FOR THE PREPARATION THEREOF

In the treatment of iron deficiency in mammals, including man, iron may be administered orally with subsequent resorption via the alimentary canal, or parenterally by intravenous or intramuscular injection of a solution containing iron. In such solutions for parenteral administration, the iron must be present as ferric iron in a stabilized form in order to prevent gel formation and precipitation, for example, precipitation of ferric hydrate at physiological pH. The iron must also be present in such a form that no toxic side reactions, whether of a local or of a general type, occur when injecting dosages containing at least 100 mg of iron. Solutions of salts of iron cannot be used for parenteral administration mainly because of their relatively high toxicity.

Various substances have previously been used as stabilizing agents in iron preparations for parenteral administration. In order to prevent precipitation of ferric hydrate by alkalization of an aqueous solution of a ferric salt solution, some kind of carbohydrate was heretofore early used as a stabilizing agent. Thus, one prior preparation for parenteral administration consisted essentially of an aqueous solution of a saccharated oxide of iron. However, in order to prevent precipitation of ferric hydroxide the pH of this iron preparation had to be alkaline, and parenteral administration of the preparation often led to undesirable side effects.

Other types of stabilizing agents previously used in preparations of iron for intramuscular injection are dextrins and dextrans. The use of dextrins and dextrans made it possible to prepare injection solutions with a physiological pH. However, preparations containing a complex of low molecular weight dextran and iron have resulted in undesirable side effects, such as local pain and discoloration of the skin surrounding the site of the injection [Acta Medica Scandinavica Suppl. 342 T. Karlefors and A. Norden "Studies on iron-dextran complex (1968)"]. Dextrin, a degraded starch, contains reducing groups which may reduce some ferric iron in the iron preparation to ferrous iron. Presence of ferrous iron in the preparations is undesirable and a limiting factor which, because of its toxicity, may give rise to side effects when administered in high dosages Still another type of stabilizing agent used in the preparation of iron preparations for intramuscular administration is a combination of sorbitol, citric acid and dextrin (Canadian Pat. No. 659,420). It was found that such a combination of sorbitol, citric acid and dextrin could be used to stabilize ferric iron so that an iron complex with an average molecular weight of about 5,000 wsa obtained, whereas the previously used iron-dextran and iron-dextrin complexes had average molecular weights exceeding 150,000. The acute toxicity, LD 50, of this complex of iron for intra-peritoneal administration to mice was about 50 mg per kg body-weight, which toxicity, although higher than the toxicity of the iron-dextrin and iron-dextran preparations, still made possible administration to humans of dosages not exceeding 200 mg. of iron. Thus, a large number of injections to a single patient is necessary. The iron in this preparation, sold under the trade name "Jectofer," is present, however, in the form of particles of such small size that they are rapidly resorbed via both the lymphatic vessels and the blood vessels. The small size of the particles and the comparatively low average molecular weight also mean, however, that about 30% of the administered amount of iron is excreted via the kidneys. The remaining part of the administered iron is utilized to a very high degree at the hematopoiesis.

Thus, it would be advantageous to have a stabilizing agent which results in relatively low losses of administered iron via the kidneys and lower toxicity permitting administration to humans of single dosages containing more than 200 mg. of iron.

It would also be advantageous to avoid the presence of reducing groups in the dextrin which may convert part of the ferric iron to ferrous iron. As stated above, previously used stabilizing agents in iron preparations for intramuscular injection contain sugar or polymers of sugar, such as dextrin or dextran, which have a stabilizing effect on a ferric colloid at neutral pH. These previously used stabilizing agents commonly contain reducing groups which to some degree convert ferric iron in the injection solution to ferrous iron. Ferrous iron is an undesired component in iron preparations for intramuscular injection due to its toxicity and may cause undesired side effects for administration of the solutions to the patients. The amount of ferrous iron present in the injection solution may, due to its toxicity, constitute a limiting factor for the maximum dosage of iron which may be administered to the patient in each injection.

SUMMARY OF THE INVENTION

A main object of this invention is to provide an iron preparation for intramuscular administration which contains, as stabilizing agent, a new polymer which 1. has the capability to stabilize ferric iron at physiological pH,
2. causes an insignificant reduction of ferric iron to ferrous iron in an injection solution,
3. has the capability to yield a complex with ferric iron which has a low toxicity and after intramuscular injection is resorbed to a high degree from an intramuscular depot while only a minor part is excreted via the kidneys, and
4. has capability to yield a complex with ferric iron which has such toxicity that a dosage of more than 500 mg of iron may be administered to humans without serious side effects.

Thus, in accordance with this invention, these objects have been met with new iron preparation which is well resorbed and which has a low toxicity making administrations of unit dosages containing more than 500 mg iron possible without serious side effects. Although the main use of the new polymer used as stabilizing agent is in the preparation of iron preparations for intramuscular administration, other fields of use are apparent as described herebelow.

The present invention provides an iron preparation for intramuscular and intravenous injections which contains, as stabilizing agent, a physiologically innocuous, water swellable polymer which is a condensation product of a hydroxy carboxylic acid and a polyhydric alcohol with a polymerizing agent selected from the group consisting of halogenated aliphatic alcohols transformable to epoxides in alkaline solution, the epoxides obtained thereby and mixtures thereof.

DETAILED DESCRIPTION OF THE INVENTION

Figure 1:
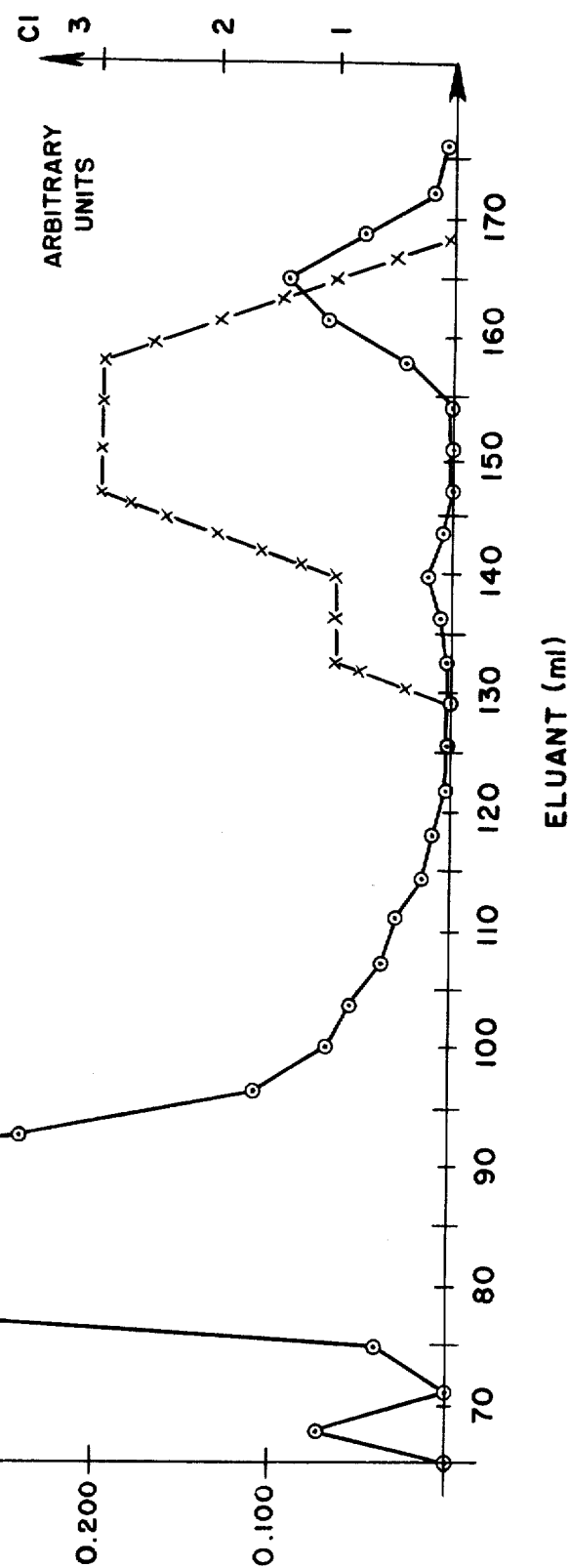

As defined herein, the term "hydroxy carboxylic acid" is at least one aliphatic hydroxy carboxylic acid containing from 2 to 10 carbon atoms, from 1 to 3 carboxyl groups and from 1 to 9 hydroxyl groups. Examples of hydroxy carboxylic acids, among others, are: aldonic acids, i.e., the initial oxidation products produced from aldoses and with the general formula $HOOC(CHOH)_nCH_2OH$ wherein n is an integer from 0 to 8; saccharic acids, i.e., polyhydroxy dicarboxylic acids which may be represented by the general formula $HOOC(CHOH)_mCOOH$ wherein m is an integer from 1 to 8; uronic acids which besides carboxyl groups also contain aldehyde groups and which may be represented by the general formula $HCO-(CHOH)_p-COOH$, wherein p is an integer from 1 to 8 inclusive; and ketoaldonic acids which have the same formula as heretofore described for the aldonic acids but which contain at least one keto group in place of a carboxyl group.

Examles of aldonic acids, among others, are: erythronic acid and threonic acid derived from corresponding tetroses: arabonic acid, xylonic acid, ribonic acid, lyxonic acid and apionic acid derived from corresponding pentoses; gluconic acid, mannonic acid, gluonic acid, idonic acid, galactonic acid, talonic acid, altronic acid, and allonic acid derived from corresponding hexoses; -α-glucoheptonic acid, β-glucoheptonic acid, α-mannoheptonic acid, β-mannoheptonic acid, α-galaheptonic acid, β-galaheptonic acid and fructoheptonic acid derived from corresponding heptoses; α-glucooctonic acid, β-glucooctonic acid, mannooctonic acid, and galaoctonic acid derived from corresponding octoses; α-gluconononic acid, β-gluconononic acid, and mannononic acid derived from corresponding nonoses; and α-glucodeconic acid and α-glucodecanic acid derived from corresponding decoses.

Examples of saccharic or aldaric acids, among others, are: tartronic acid, with the structural formula $HOOC-CHOH-COOH$: the tetraric acids, e.g., threaric acid and erythraric acid; the pentaric acids, e.g., xylaric acid, ribaric acid, and arabic acid; the hexaric acids, e.g., mannaric acid, glucaric acid, idaric acid, talaric acid, allaric acid, and galactaric acid; and heptaric and octaric acids, such as, the acid obtained by oxidation of the aldehyde group in α-glucoheptose, β-glucoheptose, mannoheptose, α-galaheptose, and β-galaheptose.

Examples of uronic acids, among others, are glucuronic acid, mannuronic acid, and galacturonic acid.

Examples of ketoaldonic acids, among others include all the aforementioned aldonic acids having a carboxyl group replaced by a keto group, such as:

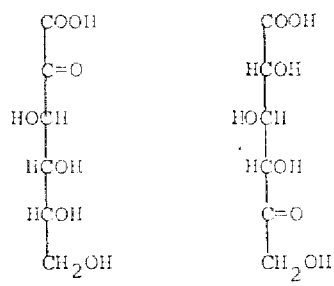

2-ketogluconic acid    5-ketogluconic acid

Further examples of hydroxy carboxylic acids, among others, are

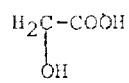

glycolic acid

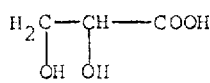

glyceric acid

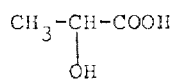

lactic acid

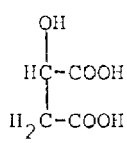

malic acid

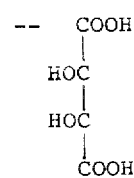

tartaric acid

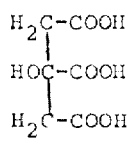

citric acid

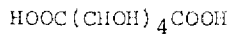

tetrahydroxyadipic acid

Many of the aforementioned hydroxy carboxylic acids occur in various steric configurations and in racemic form as well as in the form of substantially pure optical isomers. As further defined herein, the term "hydroxy carboxylic acid" includes all such steric and optical isomers as well as mixtures thereof. As still further defined herein, the term hydroxy carboxylic acid includes salts thereof, such as sodium gluconate, and lactones derived therefrom, such as gluconic acid lactone and glucoheptonic acid lactone. The use of a lactone of the hydroxy carboxylic acid as starting material is equivalent with the use of the hydroxy carboxylic acid per se, since the lactone in the alkaline solution where the polymerization is carried out is converted to the acid or a salt thereof.

The term "polyhydric alcohol" as defined herein is at least one from a broad class of aliphatic alcohols containing 2 to 10 carbon atoms and 2 to 10 alcoholic hydroxyl groups. Besides such alcohols which solely contain non-etherified groups, polyhydric alcohol as further defined herein include those which are partially etherified, i.e., one or more but not all of the alcoholic hydroxyl groups may be etherified. For instance, the hydroxyl groups may be etherified with $C_1$ to $C_5$ alkyl groups or with $C_1$ to $C_5$ hydroxylalkyl groups. One such suitable partially etherified alcohol, among others, is hydroxy propyl sorbitol.

Examples of polyhydric alcohols, among others, are glycerol and glycol with the structural formula:

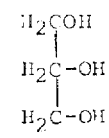

glycerol

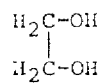

glycol tetritols, e.g., compounds with the structural formula:

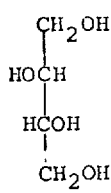 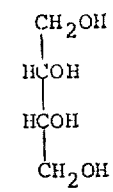

pentitols, e.g., compounds with the structural formula:

 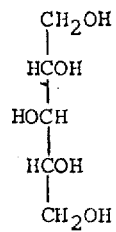 

arabitol (lyxitol)    xylitol    ribitol (adonitol)

hexitols, e.g., compounds with the structural formula:

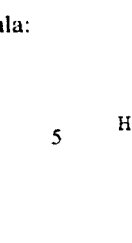 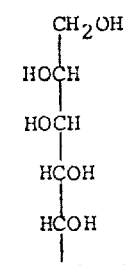 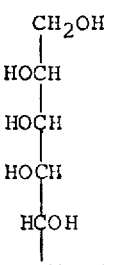 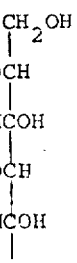

sorbitol    mannitol    talitol    iditol

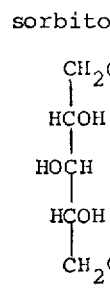 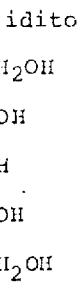

galactitol (dulicitol)      allitol heptitols, e.g., compounds with the structural formula:

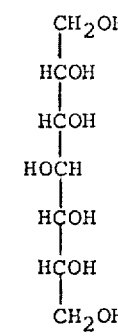 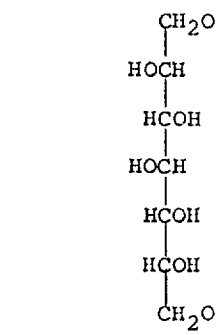 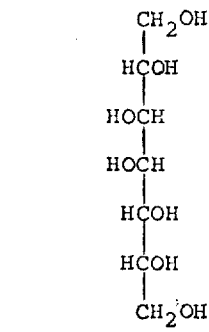

glycero-gulo-heptitol (α-Glucoheptitol)

D-glycero-D-ido-heptitol (D-β-Glycohepti-tol)

D-glycero-D-gala-heptitol (Perseitol) (α-Mannoheptitol)

 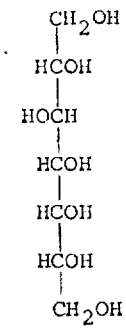 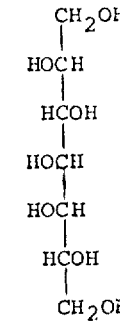 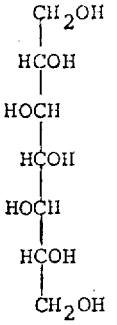

D-glycero-D-manno heptitol (Volemitol) (D-β-Manno-heptitol) (α-Sedo-heptitol)

D-glycero-D-gluco heptitol (β-Sedo-heptitol)

D-glycero-L-gluco heptitol (D-β-Gala-heptitol) (D-α-Gulo-heptitol)

glycero-ido-heptitol (meso)

octitols, mannitols and decitols, e.g.,

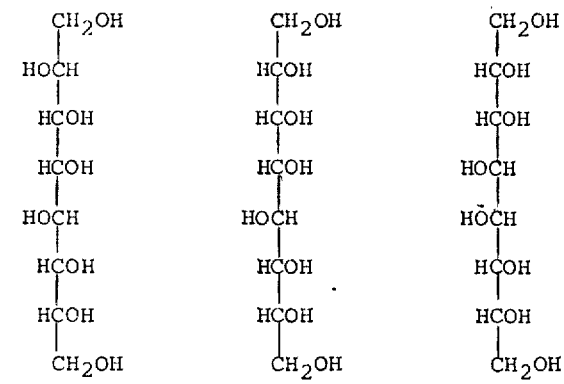

D-erythro-L-galaoctitol    D-erythro-L-talooctitol    erythromannooctitol

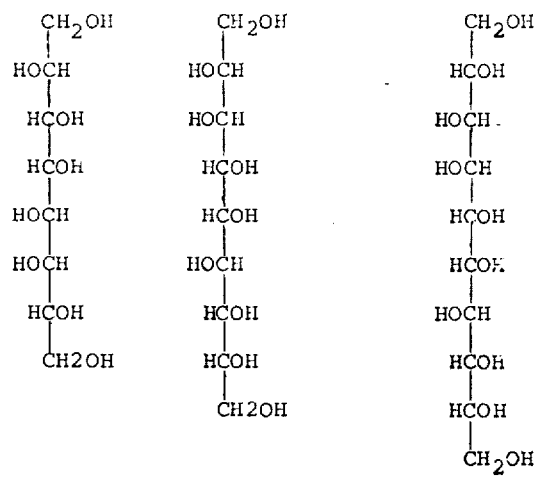

D-threo-L-gala-octitol     α,α,α-D-gluco-nonitol      α,α,α-D-gluco-decitol

Examples of other compounds within the definition of polyhydric alcohols, among others, are polyglycerols, e.g., condensation products of glycerol in which molecules of glycerol have been condensed to open-chain or cyclic ethers such as

and

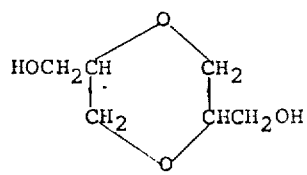

Still further examples of polyhydric alcohols, among others, are pentaerytritol, the inositols or cyclohexanehexols.

Many of the aforementioned polyhydric alcohols occur in various steric configurations and in racemic form as well as in the form of optical isomers. As further defined herein, the term polyhydric alcohol includes all such steric and optical isomers as well as mixtures thereof.

As defined herein for the polymerizing agent, the term "halogenated aliphatic alcohols transformable to epoxides in alkaline solution" includes at least one compound illustrated by the following generic formula:

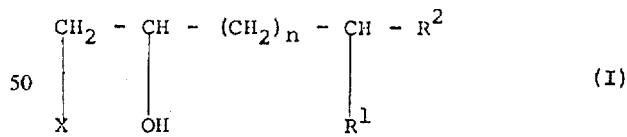

wherein n is an integer selected from the group consisting of 0,1,2,3, and 4; X is selected from the group consisting of Cl, Br, and I; $R^1$ is selected from the group consisting of OH, Cl, Br, and I; and $R^2$ is selected from the group consisting of H, and if $R^1$ is OH also the radical —$CH_2$—X, wherein X has the meaning specified above. The conversion of these alcohols to epoxides is known in the art [Fairbourne et al., Journal of the Chemical Society pages 1965–1973 (1932)].

The compounds (I) include, among others, compounds of the formula:

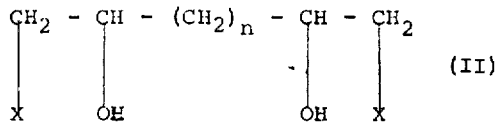

wherein n and X have the meaning specified above, and the compounds (II) in alkaline solution are converted to a diepoxide of the formula:

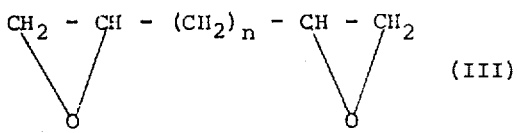

wherein $n$ has the meaning specified above.

Other compounds (I) are dihalohydrins of the formula:

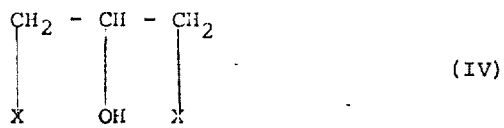

wherein X has the meaning specified above, and the compounds (III) in alkaline solution are converted to compounds of the formula:

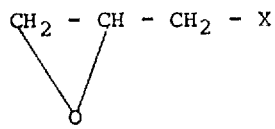

wherein X has the meaning specified above.
Still other compounds (I) have the formula:

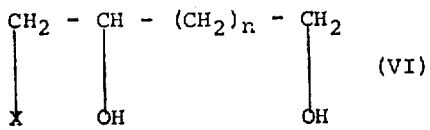

wherein n and X have the meaning specified above, and the compounds (VI) in alkaline solution are converted to compounds of the formula:

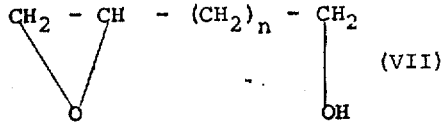

wherein n has the meaning specified above.

Specific compounds (II), among others, are those in which X is Cl and n is 0, X is Cl and n is 1 and X is Cl and n is 2.

Specific compounds (III), among others, are those in which n is 0, n is 1 and n is 2.

Specific compounds (IV), among others, are those in which both X's are chlorine, both X's are bromine and one X is chlorine and the other X is bromine.

Specific compounds (V), among others, are those in which X is chlorine, X is bromine and X is iodine.

Specific compounds (VI), among others, are those in which X is chlorine and $n$ is 0, X is chlorine and $n$ is 1, X is bromine and $n$ is 0 and X is bromine and $n$ is 1.

Specific compounds (VII), among others, are those in which $n$ is 0, $n$ is 1 and $n$ is 2.

The compounds (III), (V) and (VII) are, among others, illustrative examples of epoxides. It is a common feature of polymerizing agents of the compounds (I)–(VII) that they contain at least two reactive groups capable of participating of formation of ether linkages. As further defined herein, the term "epoxides" include, among other diepoxides and epoxycarboxylic acids.

Preferred hydroxy carboxylic acids are gluconic acid, arabonic acid and glucoheptonic acid. Preferred polyhydric alcohols are glycerol, polyglycerol, the tetritols, the pentitols, the hexitols and the heptitols. Of the polymerizing agents, the epihalohydrins, particularly epichlorohydrin, are preferred.

The especially preferred combination of reactants is gluconic acid, sorbitol and epichlorohydrin. Other suitable combinations among others are: gluconic acid lactone, sorbitol, and epichlorohydrin; arabonic acid, sorbitol and epichlorohydrin; gluconic acid lactone, pentaerytritol and epichlorohydrin; glycerol, gluconic acid lactone and epichlorohydrin; mannitol, gluconic acid lactone, and epichlorohydrin; dulcitol, gluconic acid lactone and epichlorohydrin; and hydroxypropylsorbitol, gluconic acid lactone and epichlorohydrin.

The polymer of the present invention may be prepared by any suitable method. One method is to react in a liquid medium at least one hydroxy carboxylic acid compound as defined above, at least one polyhydric alcohol as defined above and at least one polymerizing agent as defined above.

The polymerization is generally carried out in the presence of an alkali, e.g., alkali metal hydroxides. Sodium hydroxide or potassium hydroxide among others, may be used. The alkali may be used either in the form of a solution or in the solid state, for example, in the form of tablets. Alkaline earth metal hydroxides, such as, barium hydroxide, may also be used as the alkali. The preferred alkali is sodium hydroxide.

Any satisfactory proportions of the hydroxy carboxylic acid, the polyhydric alcohol and the polymerizing agent may be employed. Any satisfactory reaction temperature may also be employed and the reactants may be introduced by any suitable manner. For example, about 0.1 to about 1.0 moles of hydroxy carboxylic acid and about 0.05 to about 5 moles of polymerizing agent per mole of polyhydric alcohol may be used. In a preferred embodiment of the invention, using gluconic acid or a salt or a lactone derived therefrom, sorbitol and epichlorohydrin, from about 0.2 to about 1.0 moles of gluconic acid or derivative thereof and from about 0.1 to about 4 moles of epichlorohydrin per mole of sorbitol may be advantageously used.

It may be advantageous to carry out the polymerization by adding the alkali and the polymerizing agent separately to an alkaline aqueous solution of the hydroxy carboxylic acid and the polyhydric alcohol. However, the alkali and polymerizing agent may also be added continuously to the alkaline solution of hydroxy carboxylic acid and the polyhydric alcohol in the reaction vessel.

The reaction temperature may be varied over a wide range but is advantageously held between about 20°C. and the boiling point of the reaction mixture. The preferred reaction temperature is about 75° to 85°C.

The amount of alkali present during the reaction will depend largely upon the amount of added polymerizing agent which is added. In a preferred embodiment of the invention where sorbitol and gluconic acid, or a salt or a lactone derived thereform, are polymerized with epichlorohydrin, the total amount of hydroxyl ions present during the reaction is from about 1.5 to 4.5 moles per mole sorbitol. In the preferred embodiment, sodium hydroxide is used as alkali.

In an especially preferred method for carrying out this reaction, a solution of gluconic acid or the corresponding lactone, and sorbitol in the approximate relative amounts of about 0.1 to 1.0 mole, preferably about 0.5 mole, of gluconic acid, per mole sorbitol is prepared and made alkaline by addition of sodium hydroxide. To this solution are separately added during the course of the reaction epichlorohydrin and sodium hydroxide in the approximate relative amounts of about 0.1 to 4 moles, preferably about 2 moles, of epichlorohydrin per mole of sorbitol. The temperature of the reaction mixture is raised successively during the reaction up to the desired temperature, e.g., about 75° to 85°C. After addition of the epichlorohydrin and the sodium hydroxide, the reaction solution is allowed to stand for some time, whereafter the temperature is lowered to about 50°C. and the pH of the reaction mixture is adjusted by addition of a suitable acid, such as HCl, to a value of about 0.6 to 4; usually about 0.65 to 1.0.

The sodium chloride precipitated in the method is removed by filtration and discarded. The remaining reaction mixture is "worked up," i.e., subjected to repeated precipitation and redissolving of the polymer obtained. It is preferred to use ethanol as the precipitating agent, but other organic solvents, such as dioxane, methanol, chloroform, acetone, n-propanol and iso-propanol, among others, may be used. The addition of ethanol results in the formation of a twophase system. The aqueous phase contains the desired reaction product. The ethanol phase contains interalia such reaction products having a low molecular weight which are not precipitated. The aqueous phase containing the desired reaction product is thereafter again mixed with water and ethanol, and the resulting aqueous phase collected. This purification and fractionating procedure may be repeated several times, suitably at least five times, whereafter the final product is diluted with a suitable amount of water in order that a product which is easy to handle may be obtained.

In the polymerization reaction according to the present invention a mixture of reaction products with widely varying molecular weights is obtained. It is not possible to ascribe a precise, unitary chemical structure to the reaction products. The molecular weight distribution of the immediate reaction product obtained after the polymerization process is completed may as indicated above, be changed, by removing low molecular weight components. For characterizing the product, therefore, the terms and methods described herebelow have been used. These terms and methods are also found in the examples, where the particular reaction product in each example is described. The expression "final product" used herebelow denotes the polymer product obtained after the working up procedure, including the optional addition of water as mentioned above.

A. Loss of Weight on Drying

This is obtained by drying the final product at about 105°C. until constant weight is obtained. The loss of weight is given in percent by weight calculated on the final product.

B. Content of Water in the Final Product

This is determined by the Karl Fischer method which is described inter alia in Pharmacopoeia Nordica volume 1 page 75. The content of water is given in percent by weight calculated on the final product.

C. Content of Sodium ($Na^+$) in the Final Product

This is determined using a flame spectrophotometer and given in percent by weight calculated on the final product in dried form.

D. Content of Chloride Ions ($CL^-$) in the Final Product

This is determined by potentiometric titration and is given in percent by weight calculated on the final product or on the final product in dried form. The amounts of $Na^+$ and $Cl^-$ which are given indicate the amount of salts present in the polymer preparation and do not mean that chloride ions are present in the polymer molecule.

E. Content of Organic Dry Substance in the Final Product

This is calculated as the weight of the final product excluding the loss of weight on drying and excluding the weight of $Na^+$ and $Cl^-$ and is given in grams or in percent by weight calculated on the final product.

F. Gel filtration

The molecular weight distribution of the final product is estimated by gel filtration on Sephadex G:15, G:25 or G:50. A sample consisting of an amount of final product corresponding to about 100 mg. of organic dry substance is dissolved in 4 ml. of water, added to the column of Sephadex used and eluted with water. The eluate is analyzed for content of organic dry substance by measuring the extinction at 700 $\mu$ of a mixture of 0.5 ml. eluate and 5 ml. of a solution of 0.8 g.$K_2Cr_2O_7$ in 10 ml. $H_2O$ and 200 ml. conc. $H_2SO_4$. The extinction measured is corrected against a blank and plotted against the volume of eluate. The diagram obtained is a measure of the molecular weight distribution. The eluate is also tested for contents of $Cl^-$.

G. Content of Carboxylic Groups in the Final Solution

This is determined by passing aqueous solution of polymer through strongly acidic cation exchanger and titrating for total contents of acid with NaOH.

H. Iron-Complex-Forming Capacity of the Final Product

This may be determined by using the following solutions:

| | | |
|---|---|---|
| (I) | Distilled water | 225 ml. |
| | Lactic acid | 90 ml. (1.20 mole) |
| | Sodium hydroxide | 148 ml. (0.90 mole) |
| | Polymer (organic dry substance) | 202.5 g. |
| (II) | Sodium hydroxide | 288 g. (7.3 mole) |
| | Distilled water | 1200 ml. |
| (III) | Ferric chloride hexahydrate $FeCl_3.6H_2O$ | 270 g. (1.0 mole) |
| | Distilled water | 450 ml. |
| (IV) | Hydrochloric acid 6N | about 150 ml. |
| (V) | Distilled water | about 2.2 l |
| (VI) | Ethanol 95.5% (volume percent) | about 14.8 ml. |

Separate solutions of the ferric chloride, the sodium hydroxide and the polymer were prepared. The lactic acid (90 ml.), 2/3 of the volume of water (150 ml.) and the sodium hydroxide (148 ml.) were mixed separately before the polymer was added. The rest of the water (75 ml.) was used for rinsing the vessels whereafter it was added to the solution. The mixture (I) thus obtained was heated to 80°C with stirring.

To the mixture (I) were added alternately with vigorous stirring 9 × 90 ml. portions of the sodium hydroxide solution (II), in total 4.86 mole NaOH, and 9 × 60 ml. portions of the ferric chloride solution (III), in total 1.0 mole. The addition was carried out dropwise during 1 minute for the sodium hydroxide and dropwise during 2 minutes for the ferric chloride solution. Between each addition a delay of 2 minutes was made. One minute after the final addition of ferric chloride solution, 167 ml. (0.98 mole) of sodium hydroxide (II) was added. The temperature of the reaction mixture was thereafter kept at 80°C. for 35 minutes, whereafter the mixture was cooled to 25°C. Thereafter, the volume of the reaction mixture was adjusted to 2,250 ml. using distilled water, whereupon 5,100 ml. ethanol was added during 15-30 minutes with vigorous stirring. Thereafter, the stirring was continued for 10 minutes more. The precipitate obtained was allowed to settle for 30-60 minutes, after which the mother liquor was sucked off. The precipitate was filtered off and washed once with 900 ml. diluted ethanol (2 volumes of ethanol + 1 volume of distilled water). Thereafter, the precipitate was dissolved by adding it while stirring to 1,350 ml. of distilled water heated to 40°C. After addition of the precipitate, the solution was heated to 80°C. in about 30 minutes. Thereafter, the mixture was kept at 80°C. while stirring for 30 minutes more.

The solution was thereafter cooled to 25°C. and neutralized using 6N hydrochloric acid IV added dropwise with vigrous stirring during 20-24 minutes until the pH of the mixture was 6.2. Usually, 140-150 ml. of hydrochloric acid was necessary. The reaction mixture was freed from undissolved matter, whereafter the volume was adjusted with distilled water (V) to 2,100 ml. A second precipitation was carried out by adding to the solution with stirring 4,575 ml. of ethanol (VI) during 15-20 minutes. Stirring was continued for 2 minutes more. The precipitate was allowed to settle overnight. Thereafter, the mother liquor was sucked off and the solid was sucked off and washed three times using 900 ml. of diluted ethanol (ethanol: water 2:1) and three times with undiluted ethanol (900 ml.), whereafter it was dried in vacuum at 40°C. for 4-5 hours or overnight.

The following parameters were determined in the dried iron preparation:

1. Yield of dried iron preparation, measured in grams.
2. Yield of complex-bound iron, calculated in percent of the total amount of ferric iron added during the reaction.
3. Contents of iron in the dried iron preparation, percent by weight calculated on the dried iron preparation.

I. Resorption in Rabbit of Intramuscularly Administered Injection Solution

The injection solution of the dried iron preparation obtained as described in paragraph H above was prepared according to the following method. Distilled water (125 ml.) was heated to 80°C. in a three-necked round-bottomed flask provided with cooler, thermometer and stirrer. Dried iron preparation obtained as described above was added in small portions during 15 minutes with vigorous stirring. Dried preparation corresponding to 7.5 g. of iron was added. The solution thus obtained was kept at 80°C. for 50 minutes, whereafter it was cooled to 25°C. After dilution with distilled water to 150 ml. the solution obtained was filtered, filled into 10 ml. ampoules and sterilized at 120°C. for 20 minutes. The injection solution obtained had a total content of iron of about 50 mg/ml.

The resorption tests on rabbits were carried out in the following way. The injection solution was injected in doses of 20 mg. Fe per kg. body weight deep into the glutei of rabbits. Male albino rabbits weighing 2 to 3 kg. were consistently used. The animals were killed at different time intervals after injection and the gluteal muscles were dissected away from the leg. Musculature and skin around the injection site were wet oxidized with sulphuric acid and nitric acid, and the iron content was then determined by means of a colorimetric rhodanide method. It was found that the iron was resorbed very rapidly. In most cases, more than 60% of the administered iron had been resorbed after 24 hours; more than 85% of the iron had been resorbed after 7 day; and more than 90% of the iron had been resorbed after 14 days. It was also found that the amount of iron which was excreted after 24 hours usually was less than 15%. Thus, it is shown that iron preparations for intramuscular injection prepared using the polymer of the present invention as stabilizing agent compare favorably with presently existing and marketed interamuscularly administrable iron preparations. It can be concluded from the results of gel filtration on Sephadex G:15, G:25 and G:50 gels that the average molecular weight of the polymer in the form called "final product" is in the range 700 to about 5,000. It has also been established that polymers, which according to gel filtration tests have an average molecular weight in the range from about 1,500 to about 5,000, provide iron complexes, which in the form of injection solutions, give a particularly advantageous response with regard to resorption and excretion when tested on rabbits.

J. Intrinsic Viscosity of the Polymer

This in many cases was found to be in the range from about 0.020 to about 0.080 dl/g. It is determined according to well known procedures [Flory, Principles of Polymer Chemistry (1953)].

Figure 2:
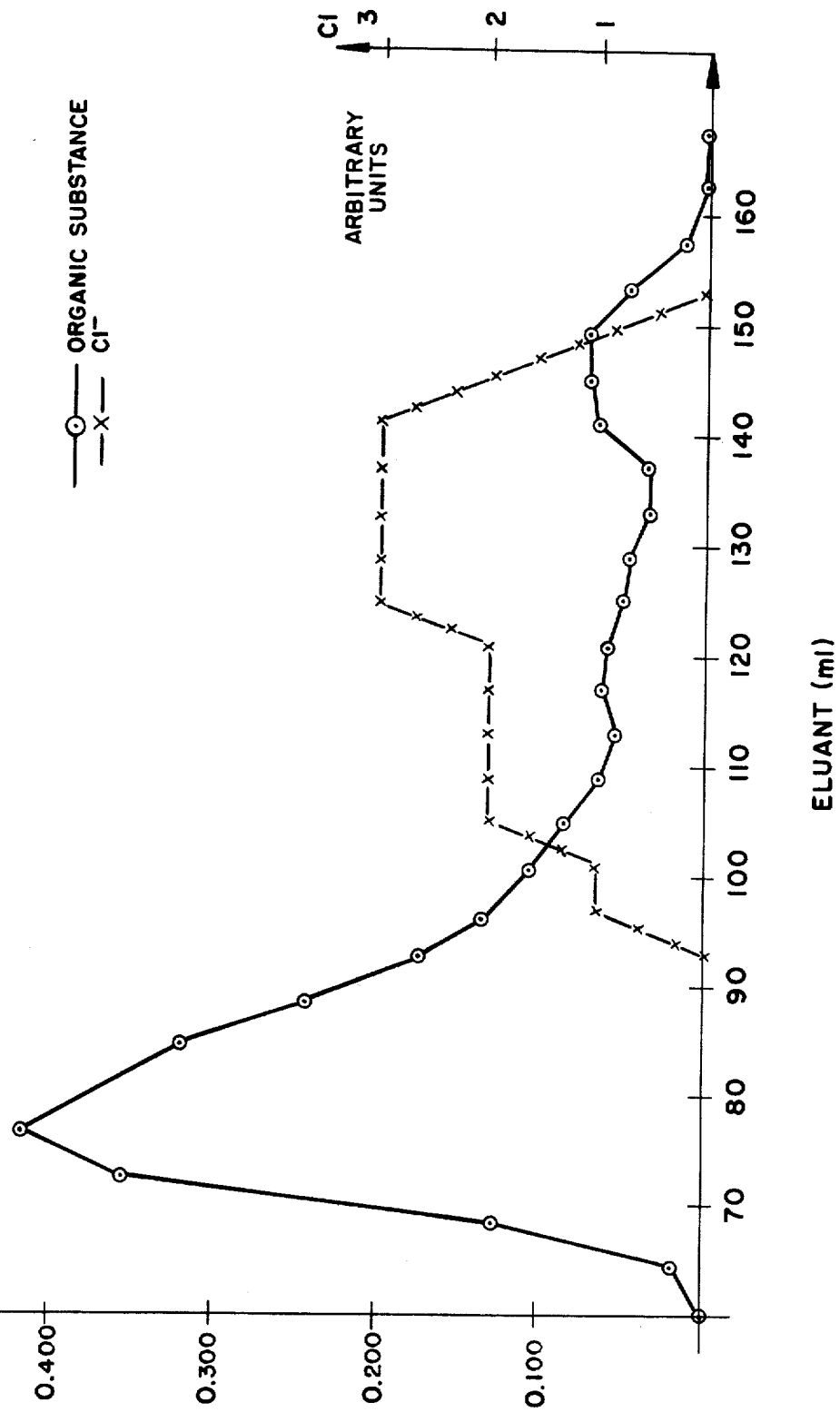
Figure 3:
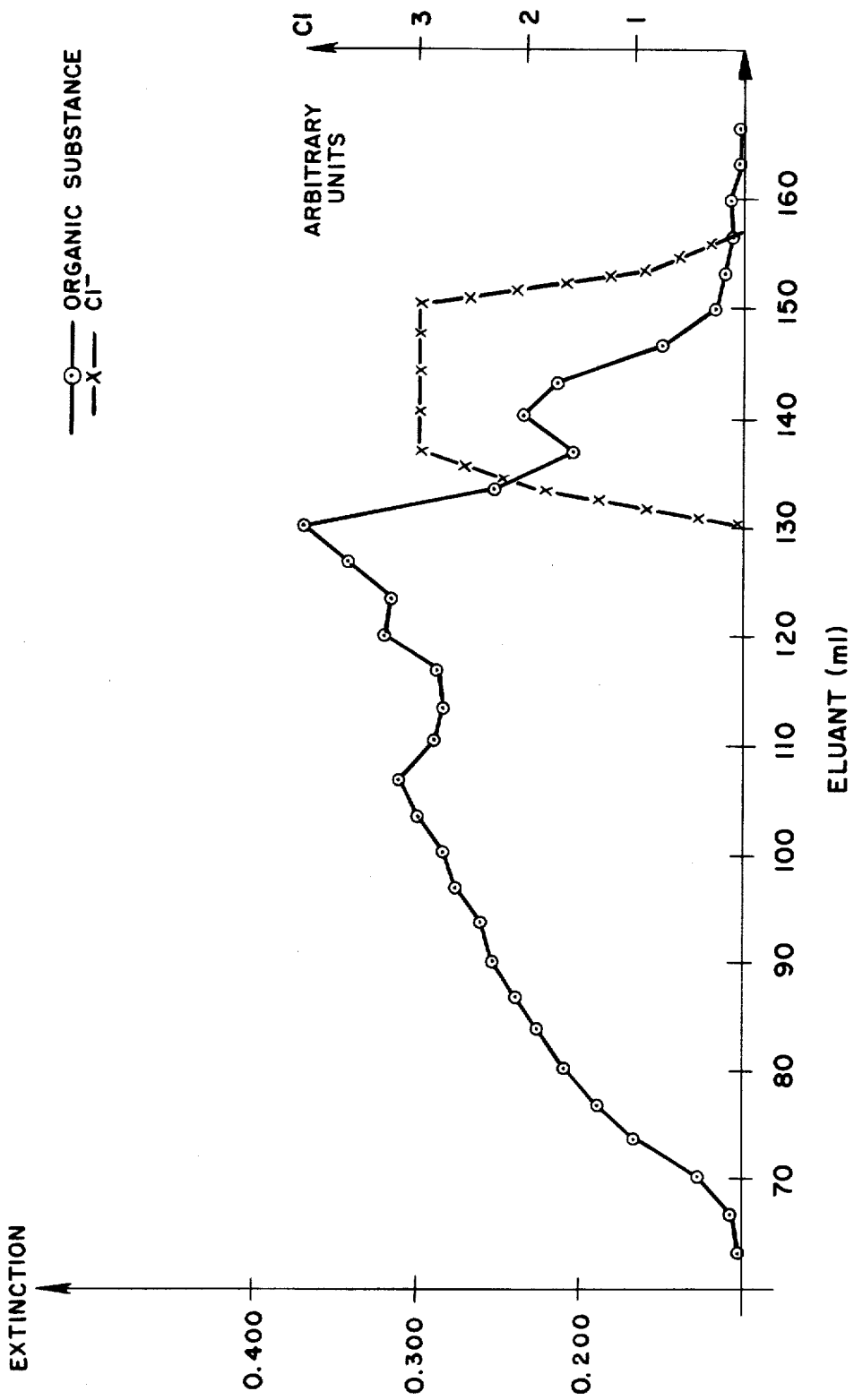

With reference to the drawings, FIGS. 1, 2 and 3 show the results of gel filtration tests on polymers according to the invention using Sephadex G:15, which is considered to separate components having a molecular weight up to about 1,500. This gel filtration test is well known in the art as evidenced by "Sephadex. Theory and Experimental Technique" published by Pharmacia Fine Chemicals, Uppsala, Sweden. The extinction is measured in arbitary units compared with a blank and shows contents of organic substance. The eluant is measured in milliliters and represents distribution of molecular weights in the polymer.

FIG. 1, based on Example 1, shows that the major part of the polymer, represented by the peak at about 80-90 ml. eluant, is not absorbed in the gel that is eluted with the first portions of eluant which are collected.

FIG. 2, based on Example 5, represents the molecular weight distribution of a polymer which has a larger proportions of components which are retarded by the gel and thus may be ascribed molecular weights below about 1,500.

In FIG. 3, based on Example 8, the component in the polymer represented is to a large extent absorbed on the gel. The peak at about 130 ml. eluant indicates that the average molecular weight of the tested polymer is well below 1,500.

In FIGS. 1, 2 and 3 the content of $Cl^-$ in the eluant has also been plotted. This is important because peak representing $Cl^-$ indicates presence of polymer fragments having about the same molecular size as Cl ion.

Figure 4:
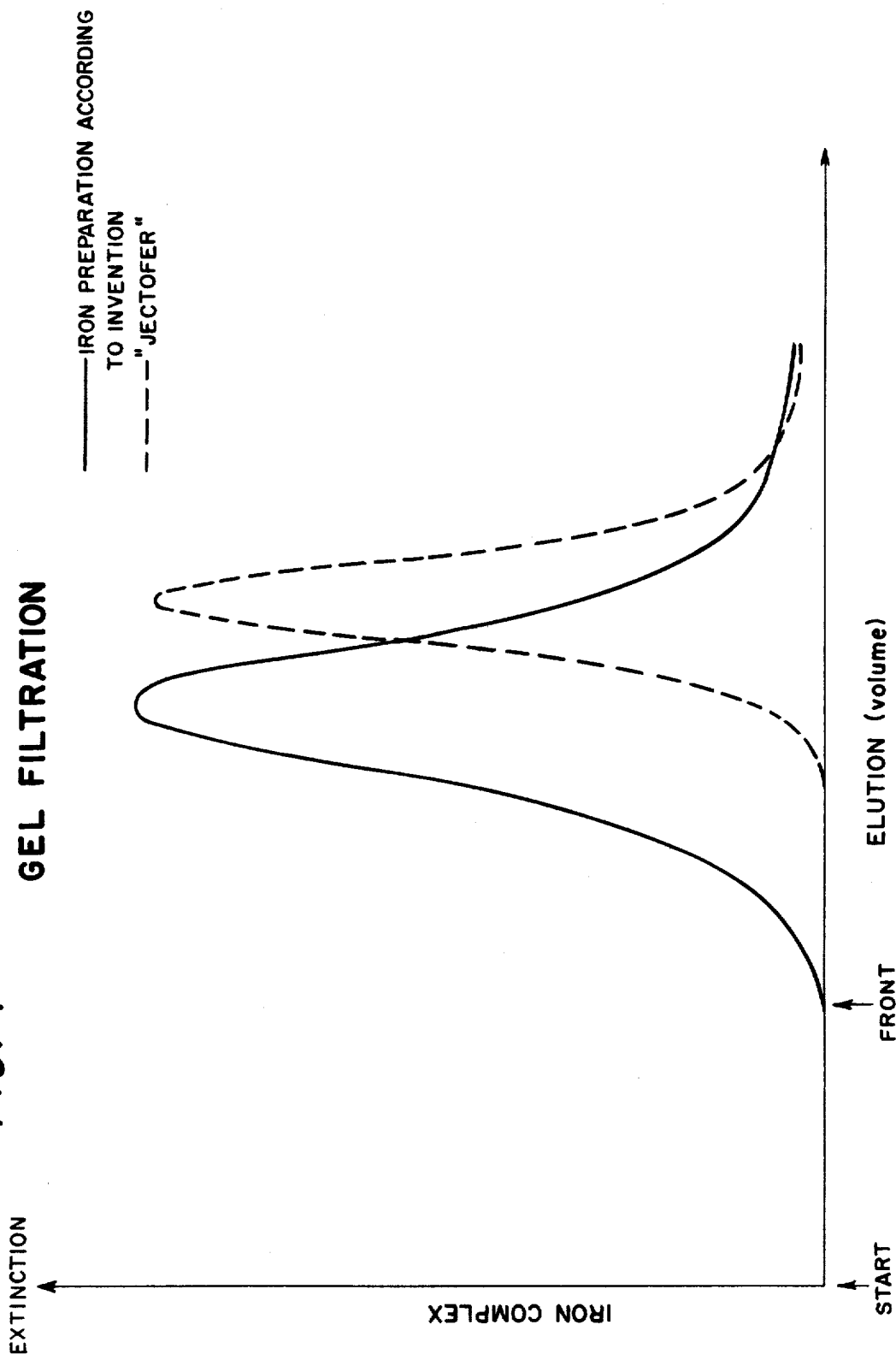

FIG. 4 gives schematically the results of gel filtration tests on "Jectofer" and an iron preparation of the present invention using "Sepharose" 6B which is a trade name of spheric agarose gel beads manufactured by Pharmacia Fine Chemicals, Uppsala, Sweden. This figure demonstrates that average molecular weight of Jectoger is lower than the average molecular weight of the new iron preparation.

The amount of carboxylic groups in the polymer of this invention generally is from about 0.2 to about 1.5 milliequivalents as calculated per g. of organic dry substance determined as described under paragraph E above.

The polymerization may be carried out in a medium which is inert to the reactant solutions. Examples of such inert media are benzene and white mineral spirits. However, an aqueous solution is the preferred medium.

In a modification of the process for preparing the polymer according to the present invention, a three step procedure can be used which is described with gluconic acid sorbitol and epichlorohydrin merely to illustrate the polymer preparation. In the first step, monoethers of epichlorohydrin and gluconic acid are prepared in acidic solution using sulphuric acid as catalyst. In a second step, epichlorohydrin and sorbitol are polymerized in alkaline solution. In the third step, the monoethers obtained in step 1 are reacted in alkaline solution with the polymer obtained in step 2, whereafter the reaction product is worked up in a similar way as described before.

The contents of carboxylic group in the polymer of the present invention may be increased by reacting the polymer in alkaline solution with monochloroacetic acid. Hydroxyl groups in the polymer react with the monochloroacetic acid with the formation of ether linkages according to the reaction scheme
(Polymer)— OH + $ClCH_2$ — COOH $\overset{NaOH}{\rightarrow}$ (polymer) — O — $CH_2$ — COO  In this reaction highly viscous solutions are commonly used and the reaction may be carried out in a medium which is inert to the reactant solutions, such as benzene.

The acute i.p. toxicity in mice of the polymer of the present invention has been found to be about 15 g organic dry substance per kg bodyweight. Thus, the polymer is practically non-toxic.

Thus, in accordance with the present invention a new polymer has been prepared which
a. is soluble or swellable in water;
b. is physiologically innocuous;
c. has capability of reacting with polyvalent metal cations such as $Fe^{3+}$, $Al^{3+}$, $Cr^{3+}$, $Sb^{3+}$, $Bi^{3+}$, $Zr^{4+}$, $Sn^{4+}$, $Ti^{4+}$, $Bi^{2+}$ and $Ca^{2+}$ or mixtures thereof, with formation of a complex between the polymer and the metal cation; and
d. has the capability of stabilizing ferric iron in aqueous solutions intended for intramuscular or intravenous injection of mammals including man.

The preferred embodiment of the invention, is the polymer built up by gluconic acid or a salt or a lactone thereof, sorbitol and epichlorohydrin, and furthermore e. contains from about 0.2 to about 1.5 milliequivalents of carboxyl groups per gram organic dry substance,
f. has an average molecular weight, as estimated by gel filtration, in the range from about 700 to about 5000.

The polymer of the present invention is particularly valuable and useful as a stabilizing agent for iron preparations intended for intramuscular injection. The use of the polymer as such a stabilizing agent is in important aspect of the present invention. The polymer may be also used, among other uses, as
a. a viscosity - regulating agent in foodstuffs, pharmaceuticals, herbicides and similar preparations, or in washing agents;
b. a substitute for blood plasma;
c. a carrier substance for biologically active substances such as enzymes;
d. a polymer - metal ion complex as a soil improving material;
e. a liquid cement or glue;
f. a starting material in the preparation of plastic materials;
g. a precipitation - or flocculation - inhibiting agent in the production of beer;
h. an additive to electrolytes;
i. a detoxifying agent.
j. in combination with suitable substances, such as $Ba^{2+}$ used as an X-ray contrast agent.

Another embodiment of this invention is iron preparation for intramuscular injection wherein the aforementioned polymer is used as stabilizing agent. A dry iron-containing composition which can be "worked up" into a preparation suitable for intramuscular injection in human and veterinary medicine is prepared by reacting in alkaline aqueous solution;
a. at least one water-soluble, ferric salt and
b. a physiologically innocuous, water swellable polymer prepard as described previously and capable of forming complexes with ferric iron at an alkaline pH, whereafter the iron-containing complex is precipitated and the precipitate is purified and dried. The reaction between the ferric salt and the polymer is carried out at a pH to provide, by addition of alkali, at the end of the reaction a pH of about 10 to 14.

The invention also includes liquid iron-containing compositions comprising an aqueous solution of the dry iron-containing composition obtained as described above. The compositions are readily soluble at physiological pH values and are sufficiently stable for the solutions to be sterilized by autoclaving.

The iron must be in the trivalent form since ferrous compounds do not give the desired stability. Suitable ferric compounds, among others, include ferric chloride, ferric nitrate, ferric sulphate and ferric acetate, and double salts (e.g., ferric ammonium sulphate and ferric potassium sulphate) and mixtures thereof.

The dried compositions may contain from about 5 % to 40 %, especially about 20 % to 36 %, by weight of iron and the injectable solutions may contain from about 500 to about 100 milligrams of iron per milliliter, especially about 50 milligrams of iron per milliliter. It is generally desirable that the iron concentration in the injection solution should be as high as possible, in order that the injected volume may be small. In some cases, however, less concentrated preparations may be more suitable.

The polymer used as stabilizing agent in the iron preparations is preferably built up by reacting, in the manner described herein, at least one hydroxy carboxylic acid selected from the group consisting of gluconic acid, arabonic acid and glucoheptonic acid and salts and lactones derived therefrom, at least one polyhydric alcohol selected from the group consisting of glycerol, polyglycerols, tetritols, pentitols, hexitols, heptitols, and hydroxyloweralkyl, hexitols and heptitols derived therefrom, and at least one polymerizing agent selected from the group consisting of epichlorohydrins and diepoxides. The preferred polymer is built up by gluconic acid, sorbitol, and epichlorohydrin as previously described.

The dry iron preparation is prepared by reacting in aqueous solution a polymer prepared as described previously, with the aforementioned water-soluble ferric compound, preferably ferric chloride, whereafter the iron-containing complex thereby obtained is precipitated and the precipitate is purified and, if desired, dried. The pH of the reaction mixture is adjusted to provide a value of about 10 to 14 at the end of the reaction. The amount of polymer used in the reaction may be in the range from about 1 to about 15 g., preferably from about 3 to about 6 g., calculated as dried product per gram of iron, depending on the particular polymer used. The reaction temperature suitably is in the range from about 0°C. to about 100°C. depending on the particular embodiment used. In the first embodiment described herebelow, the temperature is preferably at about 80°C. The pH of the acidic reaction mixture is successively increased during the reaction to a value of about 10 to 14. As the alkali, sodium hydroxide may advantageously be used. The precipitation of the iron complex from the reaction solution is effected using a nonsolvent for the complex. Ethanol is used suitably. If the solution of the iron complex is to be used directly, the complex is not precipitated after the final dissolution.

Besides water-soluble ferric compounds, ferric compounds which are slightly or very slightly soluble in water may be used, for example, freshly prepared ferric hydroxide, ferric carbonate and ferric lactate.

For purification of the precipitate, redissolution is conveniently carried out by adding the precipitate to distilled water at a temperature of about 40°C. The temperature is subsequently raised to about 80°C., and kept there for some time. Thereafter, the solution is cooled to room temperature and the pH is adjusted from about 5.5 to about 10, preferably to about 6 to about 8, with a suitable acid, such as HCl.

In one embodiment of the process for preparing the dry iron preparation, an alkaline aqueous solution of the polymer, and optionally lactic acid, is prepared. Lactic acid may be added in an amount from 0 to about 10 g. per gram of iron. The mixture is thereafter heated to about 80°C. and portions of the ferric compound in aqueous solution and portions of alkali in aqueous solutions are interchangeably added. In this way, the pH of the reaction mixture is consistently kept alkaline. The polymer is added in an amount corresponding 40 from about 1 to about 15 g. calculated as dried substance, per gram of iron. Preferably, from about 3 to about 6 g. of polymer, calculated as dried product, are used per gram of iron. The reaction mixture may thereafter be allowed to stand for some time and thereafter cooled to room temperature. The iron complex formed is thereafter precipitated using a non-solvent for the complex, suitably ethanol. The precipitate formed is separated. It is purified by repeated dissolution in water, precipitation and washing. It is finally dried.

In another embodiment of the process for preparing the dry iron preparation, a first aqueous solution containing the polymer and the total amount of the ferric salt to be used is prepared. From about 1 to about 15 g. of polymer per gram iron is used in said first aqueous solution. The preferred ratio is from about 3 to about 6 g. polymer per g. iron. To the acidic solution thus obtained, to which lactic acid suitably is not added, alkali is successively added at a suitable temperature in the range of from about 0° to 60°C. When all alkali has been added, the temperature of the reaction mixture is raised to about 80°C., kept there for some time, and subsequently lowered to about 25°C. The iron complex formed is thereafter worked up by precipitation and redissolution as described previously, with the exception that some further polymer in alkaline aqueous solution is suitably added to each redissolution. For example, if two precipitations and redissolutions are carried out, about one fourth of the amount of initially added polymer may be added during each redissolution.

When preparing an injection solution of the dry iron preparation, the dry iron preparation is dissolved in water and sterilized by autoclaving. The dry iron preparation is added in portions, with stirring, to distilled water at a temperature of about 80°C. When all the dry iron composition has been added, the temperature is kept at 80°C. for some additional time, for example, about 50 minutes, whereafter the solution is cooled to about 25°C., optionally diluted with distilled water, filtered, and filled in bottles which are autoclaved at about 120°C. for about 20 minutes. A typical preparation thus obtained contains about 5 to 100, e.g., 50, mg. iron per ml.

As is evident from the following examples, the iron preparations in the form of sterilized injection solutions are well resorbed when tested on rabbits, while at the same time the excretion of iron is low, often less than 15% 24 hours after the administration. The acute i.p. toxicity in mice of the injectable iron preparations has been found to be in the range 300 to 500 mg. per kg. of bodyweight. The acute i.p. toxicity in mice of Jectofer as tested on the same strain of mice is about 50 mg per kg. of bodyweight. The low toxicity of the iron preparation according to the present invention in combination with its high resorption and low excretion makes it possible to administer it to human patients in unit dosages containing more than 500 mg. iron. Two such dosages may be given to each patient at a single occasion.

The correlation of test results in this field between the treatment of animals, e.g., rabbits, and the treatment of human beings is substituted in the art as evidenced by Lindvall, Andersson, "Studies on a New Intra-muscular Haematinic Iron-Sorbitol," British Journal of Pharmacology and Chemotherapy, 17, 358-371 (1961) and Andersson "Clinical Investigations on a New Intramuscular Haematic," British Medical Journal, 275-279 (July 29, 1961).

The invention is further illustrated by the following examples.

EXAMPLE 1

To a 5 l. flask provided with a stirrer, charging vessel, cooler and thermometer, were added:
150 ml. deionized water
60 g. NaOH
150 g. gluconic acid lactone 300 g. sorbitol
and in the charging vessel
200 ml. epichlorohydrin The temperature of the mixture in the 5.1 flask was adjusted to 40°C. At 0, 15, 30, and 45 minutes after start, 50 ml. of epichlorohydrin was added during about 7 minutes. The temperature was raised so that after 30 minutes it was 60°C. and this temperature was maintained during the subsequent polymerization. Sixty minutes after the start, 5.0 g of NaOH was added during about 2 minutes. At 90, 120, 150, 165 and 180 minutes after start, 10.0 g NaOH was added. At 180 minutes after start also 50 ml of epichlorohydrin was added during about 7 minutes. At 195, 210 and 225 minutes after start 10.0 g. NaOH was added. At 240 and 255 minutes after start 14.0 ml. of 50% NaOH was added and 270 minutes after start 40.0 ml. of epichlorohydrin was added. At 285, 300 and 315 minutes after start 14.0 ml. of 50% NaOH was added. The polymerization was allowed to proceed at 60°C. to 415 minutes after start, whereafter the temperature was lowered to 50°C. and 50 ml. of 4N HCl was added. During continued cooling, 160 ml. 6 M HCl was added giving a pH of 0.65 in the reaction mixture obtained. The reaction mixture was filtered in order to remove precipitated NaCl, which was washed with 100 ml of 50% ethanol.

The filtrate and the washing liquor were combined and stirred with 2,220 ml. of 95% ethanol and 65 ml. of water, whereafter the polymer phase and alcohol phase were allowed to separate overnight. The following day the ethanol phase was sucked off and the polymer phase filtered in order to remove precipitated NaCl, which are washed with 100 ml. of 70% ethanol. The polymer phase was stirred with 1,550 ml. of 95% ethanol and 10 ml. of absolute ethanol. The phases were allowed to separate for 1 hour, whereafter the alcohol phase was sucked off and the polymer phase was stirred with 316 ml. of 95% ethanol and 100 ml. of water. After separation for 1 hour the alcohol phase was sucked off and the polymer phase was washed twice with 316 ml. of 95% ethanol followed by 5 washings using 300 ml. acetone each After addition of the final acetone the mixture was allowed to stand overnight. The following day the acetone was decanted and the polymer dried in vacuum dryer at 40°C. for 45 minutes.

Analysis:
Weight of polymer phase before drying: 519.1 g.
Weight loss at drying: 26.2% w/w
Contents of $Cl^-$: 6.0% w/w
Contents of $Na^+$: 4.0% w/w
Organic dry substance: 346.1 g
Gel filtration curve, Sephadex G:15, is shown in FIG. 1.

EXAMPLE 2

To a 5 l. round-bottom flask provided with stirrer, 2 dropping funnels, thermometer and cooler, were added:
300 ml. deionized water
600 g. sorbitol
67.4 g. NaOH and
300 g. gluconic acid In one droppping funnel 299 g. NaOH was dissolved in 299 ml. of water and to the other dropping funnel was added 580 ml. of epichlorohydrin.

The temperature of the mixture was raised to 75°C. whereafter the sodium hydroxide and the epichlorohydrin were added continuously during 180 minutes. Thereafter the reaction mixture was stirred for 30 minutes whereafter the temperature was lowered to room temperature and pH was adjusted to 0.7 with 6M hydrochloric acid. The reaction mixture was filtered and 1,025 ml. of the filtrate was stirred with 2,650 ml. absolute ethanol whereafter the phases in the resulting mixture were allowed to separate overnight. Next day the alcohol phase was sucked off and the polymer phase was filtered. The filtrate was stirred with 50 ml. of water and 1000 ml. of absolute ethanol, whereafter the phases were allowed to separate for 2 hours. Thereafter the alcohol phase was sucked off and the polymer phase stirred with 80 ml. of water and 800 ml. of absolute ethanol, whereafter the phases were allowed to separate for 1 hour. Thereafter the alcohol phase was sucked off and the polymer phase stirred with 40 ml. of water and 200 ml. of absolute ethanol, whereafter the phases once more were allowed to separate for 1 hour. Thereafter the alcohol phase was sucked off and the polymer phase was stirred twice with 150 ml. absolute ethanol. After this second mixing with ethanol the phases were allowed to separate overnight. Next day the alcohol phase was sucked off and the polymer phase was diluted with 20 ml. of water.

Analysis:
Weight of polymer phase before drying: 342 g.
Weight loss at drying: 29.3% w/w
Contents of $Ch^-$: 5.0% w/w
Contents of $Na^+$: 3.4% w/w
Organic dry substance: 221.7 g.

EXAMPLE 3

The polymerization up to the filtration of the reaction mixture was carried out in the same manner as the polymerization of Example 1, but at a temperature of 80°C. The filtered polymer solution and the liquid used for washing after the filtering step were combined and stirred with 1,200 ml. of absolute ethanol ethanol and 60 ml. of water. The phases were allowed to separate for 2 hours, whereafter the alcohol phase was sucked off and tthe polymer phase stirred with 700 ml. absolute ethanol and 70 ml. of water. The phases were allowed to separate for 1 hour, whereafter the alcohol phase was sucked off. The polymer phase was stirred with 175 ml. of absolute ethanol and 35 ml. of water. The phases were allowed to separate for 1 hour, wherafter the alcohol phase was sucked off and the polymer phase was stirred with 175 ml. of acetone. The mixture obtained after the final addition of acetone was sucked off and the polymer dried at 40°C. in a vacuum dryer during 45 minutes.

Analysis:
Weight of polymer phase before drying: 212.7 g.
Weight loss at drying: 16.9% w/w
Contents of $Cl^-$: 6.5% w/w
Contents of $Na^+$: 4.3% w/w
Organic dry substance: 189.9 g.

EXAMPLE 4

The polymerization up to the filtration of the reaction mixture was carried out in the same manner as the polymerization of Example 1, but at a temperature of 75°C. The filtered polymer solution and the washing liquid from the filtering step were combined and stirred with 2,500 ml. of 95% ethanol and 55 ml. of water, whereafter the polymer phase and the alcohol phase were allowed to separate overnight. The following day the ethanol phase was sucked off and the polymer phase filtered in order to remove precipitated NaCl.

The filtered NaCl was washed with 100 ml. of 70% ethanol. The polymer phase and the washing liquid were combined and stirred with 1,320 ml. of 95% ethanol. The phases were allowed to separate for 1 hour, whereafter the alcohol phase was sucked off and the polymer phase stirred with 870 ml. of 95% ethanol. The phases were allowed to separate for 2 hours, whereafter the alcohol phase was sucked off and the polymer phase stirred with 158 ml. of 95% ethanol and 22 ml. of water. After 30 minutes the alcohol phase was sucked off and the polymer phase washed twice with 150 ml. absolute ethanol and 5 times with acetone each time using 150 ml. of acetone. The mixture obtained after the final washing with acetone was allowed to stand overnight. The following day the acetone was sucked off and the polymer was dried at 40°C. in a vacuum dryer during 55 minutes.

Analysis:
Weight of polymer phase before drying: 281.2 g.
Weight loss at drying: 15.8% w/w
Contents of $Cl^-$: 6.6% w/w
Contents of $Na^+$: 4.2% w/w
Organic dry substance: 211.5 g.

EXAMPLE 5

To a 100 l. acid resistant boiler provided with stirrer, charging vessel, cooker and thermometer, were added:
2000 ml. water
1200 g. NaOH
3000 g. gluconic acid lactone
6000 g. sorbitol
and in the charging vessel
4,000 ml. epichlorohydrin The temperature of the mixture in the boiler was adjusted to 40°C. and the epichlorohydrin was thereafter added during 60 minutes. The temperature was raised so that it, after 30 minutes, was 80°C. where it was kept during the remainder of the polymerization. From 60 minutes after start to 80 minutes after start 1,200 ml. 50% NaOH was added. From 180 minutes after start simultaneous addition of 1,600 ml. 50% NaOH and 1,000 ml. epichlorohydrin was started. The epichlorohydrin was added from 180 minutes after start to 195 minutes after start and the NaOH from 180 minutes after start to 270 minutes after start. From 270 to 285 minutes after start 800 ml. of epichlorohydrin was added and from 285 to 315 minutes after start 800 ml. of 50% NaOH was added. The polymerization was therafter allowed to proceed without addition of reactants until 345 minutes after start whereafter the temperature was lowered by cooling. When the temperature of the reaction mixture was 50°C. 1000 ml. 4 M HCl was added and during continued cooling 6 M HCl was added until the pH was 0.75. Thereafter 60 l. of 95% ethanol was added to the reaction mixture. The boiler containing the resulting mixture was allowed to stand without stirring overnight. Next day the alcohol phase was sucked off and the polymer phase was filtered in order to remove precipitated NaCl. The NaCl was washed with 2 liters of 70% ethanol. The polymer phase was stirred with 14.7 liters of 95% ethanol whereafter the phases were allowed to separate for 2 hours. The alcohol phase was thereafter removed and the polymer phase stirred with 9.1 liters of 95% ethanol and 405 ml. of water whereafter the phases were allowed to separate for 1 hour. The alcohol phase was removed and polymer phase stirred twice, each time with 1,600 ml. absolute ethanol. The final separation of the phases was allowed to continue overnight. The alcohol phase was thereafter removed and the polymer phase diluted with 300 ml. of water.

Analysis:
Weight of polymer phase before drying: 3667 g.
Weight loss at drying: 26.3% w/w
Contents of $Cl^-$: 6.2% w/w
Contents of $Na^+$: 3.9% w/w
Organic dry substance: 2429.6 g.
Gel filtration curve, Sephadex G:15, is shown in FIG. 2 with contents of carboxyl groups being 0.815 milliequivalents per g. organic dry substance.

EXAMPLE 6

The polymerization was carried out in the same manner as described in Example 5 except for using 3,760 g. of sodium gluconate instead of gluconic acid lactone. The amount of NaOH present before addition of epichlorohydrin started was reduced from 1,200 g. to 526 g.

Analysis:
Weight of polymer phase before drying: 4458 g.
Weight loss of drying: 25.7% w/w
Contents of $Cl^-$: 6.1% w/w
Contents of $Na^+$: 4.0% w/w
Organic dry substance: 2976.6 g.

EXAMPLE 7

To a 5 l. round-bottomed flask provided with stirrer, dropping funnel, thermometer and cooler, were added at 45°C.:
150 ml. distilled water
60 g. NaOH
150 g. glucoheptonic acid lactone
300 g. sorbitol Two hundred and fifty ml. of epichlorohydrin were added continuously during 51 minutes. The temperature was raised to 75°C. during 20 minutes and kept there until 165 minutes after start. Thereafter the temperature was raised to 85°C. At 315 minutes after start the temperature was lowered to 75°C. The time is counted from the start of addition of epichlorohydrin. The reaction is carried out with effective stirring.

Besides the above mentioned components, the following amounts of NaOH and epichlorohydrin were added:
110 g. NaOH in solid form
50 g. NaOH dissolved in 55 ml. distilled water to a volume of about 70 ml.
90 ml. epichlorohydrin The addition of these further reactants was carried out in portions according to the following table:

| Time (minutes after start of addition of first portion of epichlorohydrin) | Epichlorohydrin (ml.) | NaOH Solid form (g.) | NaOH Solution (ml.) |
|---|---|---|---|
| 60 | | 5 | |
| 75 | | 5 | |
| 90 | | 10 | |
| 105 | | 10 | |
| 120 | | 10 | |
| 135 | | 10 | |
| 150 | | 10 | |
| 165 | | 10 | |
| 180 | 50 | 10 | |
| 195 | | 10 | |
| 210 | | 10 | |
| 225 | | 10 | |
| 240 | | | 14 (10 g.NaOH) |
| 255 | | | 14 |
| 270 | 40 | | |
| 285 | | | 14 |
| 300 | | | 14 |
| 315 | | | 14 |

At 415 minutes after the start of addition of the first portion of epichlorohydrin the reaction mixture was cooled to 60°C. and 50 ml. 4M HCl were added slowly under continued cooling and stirring. Thereafter 6M HCl was added until pH was 0.8. The acidified reaction mixture was filtered and the solid residue on the filter was washed twice with ethanol, first with 25 ml. and then with 50 ml. of ethanol diluted with one volume of water. The filtrate was diluted and combined with the washing liquid giving a volume of 1,025 ml. excluding the ethanol in the washing liquid. Thereafter 2,560 ml. of 99.5% ethanol was added while stirring, whereafter the mixture was allowed to stand overnight. The alcohol phase was decanted and the polymer phase, containing crystals of NaCl, was filtered. The solid residue on the filter was washed twice with 50 ml. of ethanol, diluted to the same concentration as the alcohol phase. The filtrate and the washing liquid were combined, giving a volume of 860 ml. Thereafter 152 ml. of distilled water and 1,520 ml. of 99.5% ethanol were added and the mixture was allowed to stand for 90 minutes. Thereafter the ethanol phase was decanted and the polymer phase, volume 550 ml, was mixed with 110 ml. of distilled water. To the resulting mixture 1100 ml. of 99.5% ethanol was added. The mixture was allowed to stand for 30 minutes. The ethanol phase was decanted and the polymer phase, volume 450 ml. was mixed with 90 ml. of distilled water and with 900 ml. of 99.5% ethanol. The ethanol phase was decanted after 30 minutes. The polymer phase, volume 410 ml. was mixed with 41 ml. of distilled water and with 205 ml. of 99.5% ethanol. After 30 minutes the ethanol phase was decanted and the polymer phase washed twice with 205 ml. of 99.5% ethanol and 5 times with 205 ml. of acetone. The washed polymer was dried in vacuum in order to remove residual acetone. The polymer obtained was weighed and mixed with about 1/10 of distilled water in order to give the product a suitable consistency.

Analysis:
Weight of polymer phase before drying: 390 g.
Weight loss at drying: 18.7% w/w
Contents of $Cl^-$: 4.8% w/w
Contents of $Na^+$: 3.3% w/w

EXAMPLE 8

The polymerization up to the filtration of the reaction mixture was carried out in the same way as the polymerization of Example 1, but at a temperature of 85°C.

The reaction mixture was filtered and the crystals of NaCl were washed with 100 ml. 50% acetone. The filtered polymer solution and the washing liquid were stirred with 2,560 ml. of acetone. The phases were allowed to separate overnight. The following day the acetone phase was sucked off and the polymer phase was filtered. Precipitated NaCl was washed with 100 ml. of 70% acetone. The polymer phase and the acetone used for washing were combined and stirred with 100 ml. of water and 2,000 ml. of acetone whereafter the phases were allowed to separate for 1 hour. The acetone phase was sucked off and the polymer phase stirred with 200 ml. of water and 2,000 ml. of acetone. The phases were allowed to separate for 1 hour, whereafter the acetone phase was sucked off and the polymer phase stirred with 100 ml. water and 500 ml. acetone. The phases were allowed to separate for 1 hour whereafter the acetone phase was sucked off and the polymer phase stirred with acetone four times, 500 ml. acetone each time. After the fourth stirring with acetone the polymer phase was filtered. The filtered polymer phase was thereafter dried in a vacuum drier at 40°C. for 1 hour and 30 minutes.

Analysis:
Weight of polymer before drying: 857 g.
Weight loss at drying: 30.9%
Contents of $Na^+$: 110.3% w/w
Contents of $Cl^-$: 6.8% w/w
Organic dry substance: 491.7 g.
Gel filtration curve, Sephadex G:15, is shown in FIG. 3 with contents of carboxyl groups being 0.540 milliequivalents per g. organic dry substance.

EXAMPLE 9

The polymerization was carried out at 85°C. but otherwise using methods and amounts of reactants as described in Example 1 up to precipitation of the polymer with ethanol.

The filtered polymer solution and the washing liquid from the filtering step were combined and stirred with 2,680 ml. of 95% ethanol whereafter the polymer phase and the alcoholic phase were allowed to separate overnight. Next day the ethanol phase was sucked off and the polymer phase filtered in order to remove precipitated NaCl. The precipitated crystals of NaCl were washed with 100 ml. of 70% ethanol. The polymer phase and the washing liquid were combined and stirred with 657 ml. of 95% ethanol and 5 ml. of water. The phases were allowed to separate for 1 hour whereafter the alcohol phase was sucked off and the polymer phase stirred with 333 ml. of 95% ethanol and 20 ml. of water. The phases were allowed to separate for 1 hour whereafter the alcohol phase was sucked off. The polymer phase was stirred with 50 ml. absolute ethanol and 10 ml. water. The phases were allowed to separate for 30 minutes whereafter the alcohol phase was sucked off and the polymer phase treated twice with 50 ml. of absolute ethanol and thereafter treated 5 times with 50 ml. of acetone. The final mixture of acetone and polymer was allowed to stand overnight. The following day the acetone was sucked off and the polymer dried at 40°C. for 1 hour.

Analysis:
Weight of polymer phase before drying: 90.1 g.
Weight loss at drying: 12.1% w/w
Contents of $Cl^-$: 6.7% w/w
Contents of $Na^+$: 4.7% w/w
Organic dry substance: 70.6 g.

EXAMPLE 10

The polymerization was carried out at 85°C. but otherwise using method and amounts of reactants as described in Example 1 up to precipitation of the polymer with ethanol. One third of the filtered polymer solution was stirred with 600 ml. absolute isopropanol and 42 ml. of water. The phases were allowed to separate overnight. The following day the isopropanol phase was sucked off and the polymer phase filtered. The filtrate was stirred with 540 ml. of isopropanol and 27 ml. of water. The phases were allowed to separate for 2 hours whereafter the isopropanol phase was sucked off and the polymer phase stirred with 440 ml. of isopropanol and 40 ml. of isopropanol and 40 ml. of water. The phases were allowed to separate for 1 hour. Thereafter the isopropanol phase was sucked off and the polymer phase stirred with 110 ml. of isopropanol and 22 ml. of water. The phases were allowed to separate 1 hour. Thereafter the isopropanol phase was sucked off and the polymer phase stirred twice with isopropanol the polymer was filtered whereafter it was treated 5 times with acetone (80 ml. of acetone each time). After the final treatment with acetone the polymer was dried in a vacuum drier for 1 hour at 40°C.

Analysis:
  Weight of polymer phase before drying: 155.4 g.
  Weight loss on drying: 19.6%
  Contents of $Cl^-$: 5.6% w/w
  Contents of $Na^+$: 8.2% w/w
  Organic dry substance: 108.1 g.

EXAMPLE 11

To a 5 l. round-bottomed flask provided with stirrer, dropping funnel and cooler, were added:

300 g. sorbitol
  94 g. sodium gluconate
  121.4 g. water
  22.4 g. NaOH

The temperature of the mixture was adjusted to 40°C. and the addition of 200 ml. epichlorohydrin was commenced. The reaction temperature was raised so that a after 30 minutes the temperature was 80°C. Sixty minutes after start all epichlorohydrin had been added and addition of 45 g. NaOH dissolved in 45 Ml. of water was started. At 175 minutes after start sodium gluconate (94g.) and 3.9 g. NaOH dissolved in 28.6 g. water were added. At 180 minutes after start addition of 50 ml. epichlorohydrin was begun simultaneously with addition of 60 g. NaOH in 60 ml. water. From 195 minutes after start to 270 minutes after start only NaOH solution was added. From 270 to 285 minutes after start 40 ml. epichlorohydrin was added. From 285 to 315 minutes after start 30 g. NaOH dissolved in 30 ml. water and added. At 345 minutes after start the polymer solution was cooled. When its temperature was 50°C. addition of 50 ml. 4 M HCl was started followed by 150 ml. 60 M HCl giving a pH in the polymer solution of 0.7. To the suspension of polymer and precipitated sodium chloride was added under stirring 2,560 ml. absolute ethanol. After stirring for 10 minutes the phases were allowed to separate overnight. The following day the alcohol phase was sucked off and the polymer phase filtered. The NaCl crystals were washed with 100 ml. 70% ethanol. The filtrate and the washing liquid were combined and stirred with 52 ml. deionized water and 1,040 ml. absolute ethanol whereafter the phases were allowed to separate for 2 hours. The alcohol phase was sucked off and the polymer phase stirred with 66 ml. water and 660 ml. absolute ethanol whereafter the phases were allowed to separate for 1 hour. The alcohol phase was sucked off and the polymer phase stirred with 26 ml. of water and 130 ml. absolute ethanol whereafter the phase were allowed to separate for 1 hour. The alcohol phase was sucked off and the polymer phase stirred twice with 120 ml. absolute ethanol. After the second stirring with ethanol the phases were allowed to separate overnight. The following day the alcohol phase was sucked off and the polymer phase diluted with 21 ml. of water.

Analysis:
  Weight of polymer phase before drying: 301 g.
  Weight loss on drying: 26.5% w/w
  Contents of $Cl^-$: 5.5% w/w
  Contents of $Na^+$: 3.8% w/w
  Organic dry substance: 200.6 g.

Iron preparations using polymers prepared according to some of the foregoing examples were prepared as described under paragraph H above. The following results were obtained as set forth in Table 1.

TABLE 1

| Example | Yield of dry iron preparation(g) | Yield of Complex-bound iron (%) | Contents of iron in dry iron preparation (%) | Resorption after 24 hr. — 7 days — 14 days (%) | | Excretion after 24 in (%) |
|---|---|---|---|---|---|---|
| 2 | 19 | 40.3 | 26.3 | 61 | 86 | 7.2 |
| 3 | 35.4 | 84.0 | 29.4 | 67 | 90 | 93 | 12 |
| 4 | 17.4 | 37.2 | 26.5 | 42 | 80 | | 9 |
| 6 | 80.5 | 66.0 | 22.9 | 68 | 86 | | 19 |
| 5 | 75.4 | 63.0 | 23.5 | 57 | 83/87 | 11 | |
| 7 | 26.6 | 56.6 | 26.4 | 70 | 82 | 93 | 9 |
| 8 | 28.4 | 72.5 | 31.7 | 18 | 51 | | 6 |
| 9 | 33.9 | 77.0 | 28.9 | 43 | 41 | 59 | 11 |
| 10 | 27.6 | 70 | 31.5 | 11 | 26 | 41 | 12 |

EXAMPLE 12

This example relates to a three step preparation of a polymer.

Step 1

To a two liter round-bottomed flask provided with stirrer, dropping funnel, thermometer and cooler, were added;

360 ml. distilled water
  360 g. gluconic acid lactone, about 2 moles.

The mixture was heated to 60°C.

Three ml. concentrated sulphuric acid was added as catalyst.

One hundred and ninety g. epichlorohydrin corresponding to about 162 ml. and 2.05 moles were dropwise during 100 min. The temperature was kept at 60°–65°C. by effective stirring while the epichlorohydrin is mixed with the water phase. The heating and stirring was continued for 180 minutes calculated from the start of addition of epichlorohydrin. Thereafter the reaction mixture was cooled to room temperature and was allowed to stand overnight.

Volume: 700 ml.

Step 2

To a 5 l. round-bottomed flask provided with stirrer, dropping funnel, thermometer, and cooler, were added at 45°C:

150 ml. of distilled water,
450 g. sorbitol and
26.3 g. NaOH

Two hundred and fifty ml. epichlorohydrin were added continuously during 60 minutes. The temperature was raised to 75° during 20 minutes calculated from the start of addition of epichlorohydrin. This temperature was thereafter retained under the polymerization which was carried out while stirring effectively.

One hundred and twenty five g. NaOH were added in the form of tablets according to the following scheme: 5 g. after 75 minutes, 15 g. after 105, 135, 165, 195, 225, 255, 285, and 315 minutes. After 345 minutes the reaction mixture was cooled to room temperature and was allowed to stand overnight.

Step 3

The reaction product from step 2 was heated to 60°C. whereafter the reaction product obtained in step 1 was added in portions of 100 ml. Every addition was made during 10 minutes and after each such addition NaOH in the form of tablets were added to the mixture. Times and amounts of the various additions are given in Table 2.

TABLE 2

| Time (min.) | Product from step 1 (ml.) | NaOH (g.) |
|---|---|---|
| 0 | 100 | |
| 15 | | 10 |
| 25 | | 10 |
| 25 | | 10 |
| 45 | | 10 |
| 50 | 100 | |
| 60 | | 10 |
| 65 | | 10 |
| 70 | | 10 |
| 75 | 100 | |
| 85 | | 10 |
| 90 | | 10 |
| 95 | 100 | |
| 105 | | 10 |
| 110 | 100 | |
| 120 | | 10 |
| 125 | 100 | |
| 135 | | 10 |
| 140 | | 10 |
| 145 | 100 | |
| 155 | | 10 |
| 160 | | 10 |
| 165 | | 10 |
| 170 | | 10 |
| 175 | | 10 |
| 180 | | 10 |
| 190 | | 10 |
| 200 | | 10 |

After having kept the temperature at 60°C. during 300 minutes the mixture was cooled to 40°C. 620 ml. 6 M HCl was added with continued cooling during 30 minutes. After the addition of HCl the pH was about 0.8.

The reaction mixture from step 3 was filtered. The remainder on the filter was washed with 50 ml. ethanol diluted with 1 volume of distilled water. The washing liquid was mixed with the filtrate and thereafter diluted to 2100 ml. with distilled water. 5250 ml. (2.5 volumes) of 99.5% ethanol was added while stirring. The mixture was allowed to stand for 40 minutes whereby two phases become apparent. The ethanol phase was decanted off and the remaining phase was allowed to stand overnight. Precipitated NaCl was filtered off and washed 3 times with 25 ml. ethanol diluted to the same concentration as the mother liquor. The washing liquid was mixed with the filtrate giving a total volume of 920 ml. Distilled water (184 ml.) was added and thereafter 1,840 ml. of 99.5% ethanol. The mixture was allowed to stand for 60 minutes whereafter the mother liquor was decanted off. The remaining phase, volume 750 ml., was mixed with 150 ml. of distilled water whereafter 1,500 ml. of 99.5% ethanol was added while stirring. The mixture was allowed to stand for 10 minutes, whereafter the major part of the mother liquor could be decanted off. The very viscous remaining phase was allowed to stand overnight in order to achieve a better separation of the mother liquor. The remaining phase, volume 440 ml. was mixed with 44 ml. of distilled water and 220 ml. of 99.5% ethanol. After 60 minutes the mother liquid was decanted off and the remaining phase washed twice with 220 ml. of 99.5% ethanol and five times with 220 ml. of acetone. The washed product was dried in vacuum during two hours at 50°C. giving 562 g. of product. Distilled water (56 ml.) was added in order to obtain a more handable product, Yield after addition and mixture with water was 607.7 g.

Analysis
 Weight loss at drying: 24.8%
 Contents of $Cl^-$: 4.9%
 Contents of $Na^+$: 3.5%

EXAMPLE 13

A polymer was prepared from sorbitol, gluconic acid lactone and epichlorohydrin in the same way as described in Example 4. A carboxymethyl ether derivative was then prepared.

To a round-bottomed flask, volume 2 l. provided with stirrer, dropping funnel, thermometer and cooler, were added:

82.0 g. polymer, calculated organic dry substance
20 ml. distilled water
400 ml. benzene Ninety g. NaOH dissolved in 80 ml. of distilled water was dropped into the above mixture. Monochloroacetic acid (112 g.) was added during 10 minutes with vigorously stirring. The temperature was kept at about 50°C. under 300 minutes calculated from the start of addition of monochloroacetic acid. Thereafter the mixture was cooled to room temperature and was allowed to stand for 30 minutes, whereby the benzene phase is separated from the ater phase. The benzene phase was sucked off and the water phase mixed with 200 ml. 6 M HCl giving a pH of 1.25. At the addition of acid, further benzene separated and was sucked off. The volume of the water phase was 500 ml. Then 1,000 ml. of 99.5% ethanol was added while stirring. The mixture was allowed to stand for 30 minutes yielding 1 water phase and 1 solid crystalline phase. The water phase was filtered off and evaporated in vacuo to about 250 ml. The pH, 1.2, was adjusted using about 3 g. $NaHCO_3$. The evaporation was thereafter continued until the volume was about 180 ml. Then 450 ml. of 99.5% ethanol was added with stirring, whereafter the mixture was allowed to stand overnight. The crystalline precipitate which had formed was filtered off and the filtrate evaporated in vacuo to about 160 ml. pH 1.4. The remainder after the evaporation was washed five times with 160 ml. acetone and thereafter dried in vacuo during 3 hours at 40°C. 134 g. of product was obtained, which product was diluted to 150 g. with distilled water in order that a more handable product would be obtained.

Analysis:
Weight loss at drying: 15.4%
Contents of $Cl^-$: 6.9%
Contents of $Na^+$: 5.9%

The contents of carboxylic acid in the high-molecular fraction groups increased from 0.319 milli-equivalents per gram organic dry substance in the starting material to 2.479 milliequivalents per gram organic dry substance in the end product.

EXAMPLE 14

Polymers of sorbitol, epichlorohydrin and gluconic acid was prepared using varying amounts of epichlorohydrin and gluconic acid lactone. The variations were made with the following procedure as a basis:

To a mixture, temperature 45°C., of 300 ml. distilled water
120 g. NaOH
300 g. gluconic acid lactone
600 g. sorbitol was added 400 ml. of epichlorohydrin during about 50 minutes. The temperature was successively raised to 80°C. under effective stirring. Thereafter during 270 minutes were added further 180 ml. of epichlorohydrin, one portion of 100 ml. 180 min. after the start of addition of the first 400 ml. epichlorohydrin, and one portion of 80 ml. 270 minutes after the start of addition of the first 400 ml. of epichlorohydrin and 271 g. of NaOH in 12 portions of about 20 g. and 3 portions of 10 g. The reaction was worked up using precipitation with ethanol as described previously.

The total amounts of sorbitol, epichlorohydrin and gluconic acid which had been added were 600 g., 580 ml. and 300 g. respectively. Polymers were prepared using relative amounts of the reactants according to the following tabulation.

TABLE 3

| Sorbitol (g.) | Used amount of epichlorohydrin (g.) | gluconic acid (g.) | Yield of dry substance (g.) |
|---|---|---|---|
| 600 | 25 | 300 | 228 |
| 600 | 580 | 300 | 332 |
| 600 | 880 | 300 | 527 |
| 600 | 980 | 300 | 493 |
| 600 | 1080 | 300 | 317 |
| 728 | 580 | 150 | 656 |
| 684 | 580 | 200 | 556 |
| 472 | 580 | 450 | 202 |

When the amount of epichlorohydrin and gluconic acid lactone was varied, corresponding corrections of the total amount of NaOH were made.

Also the total amount of NaOH used in the above mentioned "standard" reaction was varied. In the process used as basis, a total of 391 g. of NaOH was added. Polymers were obtained using a total amount of 210, 290, 471, and 551 g. NaOH in the standard procedure described above. The additions of 210 and 290 g. NaOH were carried out with addition of smaller amounts than in the standard process mainly during the latter part of the polymerization. The processes with increased amounts of NaOH were carried out with addition of larger amounts in the first part as well as in the latter part of the polymerization process.

EXAMPLE 15

This example relates to the preparation of a dry iron composition. In 113 ml. of distilled water, were dissolved 154 g. polymerizate (final product) prepared in the same way as described in Example 6 and 45 ml. lactic acid. A separate solution of 144 g. NaOH in 600 ml. distilled water was prepared. Of this NaOH solution, 75 ml. was added to the mixture of polymerizate and lactic acid. After heating the mixture thus obtained to 80°C. with stirring in a closed 2 1. round-bottomed flask provided with baffles, 9 portions of 45 ml. each of the NaOH solution were added. After addition of each such portion 30 ml. of a 1.88 M solution of ferric chloride was added. The additions were made dropwise during 1 minute for the sodium hydroxide solution and during 2 minutes for the ferric chloride solution. The additions of NaOH-solution and of ferric chloride solution were made at 2 minute intervals. After addition of the ninth portion of ferric chloride solution, 83 ml. of the NaOH-solution was added. The temperature of the reaction mixture was thereafter kept at 80°C. for 35 minutes with stirring, whereafter the reaction mixture was cooled to 25°C. The solution was thereafter diluted to 1,125 ml. To the diluted solution was added 2,550 ml. 95% ethanol during 20 minutes with stirring. Thereafter the stirring was continued for 10 minutes. After 60 minutes, the mother liquor was sucked off from the deposited precipitate and the precipitate was washed with 450 ml. 63% ethanol. The precipitate was thereafter dissolved in 675 ml. of distilled water at a temperature of 40°C. in a closed 1 l. flask with stirring. Thereafter the temperature was raised to 80°C. during 30 minutes, whereafter the mixture was heated with stirring at 80°C. for 30 minutes. The solution was cooled to 25°C. and pH adjusted to 6.8 using 6 N HCl. Thereafter the insoluble precipitate formed during the reaction was separated by centrifuging for 2 minutes. This precipitate weighed 30 g. in the dry state. The solution was thereafter filtered through Seitz filter 3/125. The filtrate was diluted to 1,050 ml. with distilled water and 2300 ml. of 95% ethanol was added dropwise during 20 minutes with stirring, whereafter the stirring was continued for 2 minutes. The precipitate obtained was allowed to stand for 15 hours, whereafter the mother liquor was sucked off from the deposited precipitate and the precipitate was washed 3 times with 450 ml. of 63% ethanol and 3 times with 450 ml. 95% ethanol. The precipitate was dried in vacuum at 40°C., whereafter 72.8 g. of a dried preparation with an iron content of 24.3% by weight, calculated on the dried preparation was obtained.

EXAMPLE 16

This example is concerned with the preparation of injection solution. 41.2 g. of the dried preparation obtained in Example 15 was added in portions during 15 minutes to 170 ml. of distilled water at a temperature of 80°C. in a closed 250 ml. round-bottomed flask under stirring. The temperature was thereafter kept at 80°C. for a further 50 minutes whereafter the solution was cooled to 25°C. The solution was diluted to 200 ml. After filtration through Seitz filter No. 3/1250 and 0.65 $\mu$ membrane filter, the solution was filled into 10 ml. injection bottles which were sterilized at 120°C. for 20 minutes. The iron solution obtained had a total content of iron of 48.8 mg/ml.; a content of ferrous iron of 0.70 mg/ml.; a viscosity of 5.4 cps and a pH of 7.47.

The resorption of the iron in rabbit after injection of 20 mg. of iron per kg. bodyweight was 63% after 24 hours and 88% after 7 days. After 24 hours, 16% of the iron had been excreted.

EXAMPLE 17

A dry iron composition was prepared in the same way as described in Example 15, except that only 6 portions of the solutions of ferric chloride and sodium hydroxide were added. Furthermore, the final addition of 83 ml. of NaOH-solution was omitted. The ratio of grams of polymer organic dry substance to grams of iron was therefore 5.44 instead of 3.61. Only 0.3 g. of precipitate was formed during the reaction, and centrifuging of the solution was omitted. 79.1 g. of dried iron preparation was obtained. The contents of iron was 22.1% by weight calculated on dried iron preparation.

With the resulting dried iron preparation, an injection solution was prepared as described in Example 14B. The total content of iron in the injection solution obtained therefrom was 51.8 mg/ml; the content of ferrous iron was 0.36 mg/ml; the viscosity was 7.82 cps; and the pH was 7.62.

The resorption in rabbit after injection of 20 mg. of iron per kg. bodyweight was 68% after 24 hours and 89% after 7 days. After 24 hours 21% of the administered iron had been excreted.

EXAMPLE 18

1.52 kg. of polymer (final product) using a polymer prepared from sorbitol, gluconic acid lactone and epichlorohydrin in accordance with the same procedure of Example 6 and 0.45 l. of lactic acid were dissolved in 1.125 l. of distilled water. A separate solution of NaOH was prepared by dissolving 1.15 kg. NaOH in 4.8 l. distilled water. 0.745 l. of the NaOH-solution was added to the solution of polymer and lactic acid. The mixture obtained was heated to 80°C. while stirring in a 30 l. acid resistant boiler provided with baffles, whereafter 6 portions of 0.45 l. each of the NaOH-solution were added. After each addition of NaOH, 0.3 l. of a 1.88 M solution of ferric chloride was added. The additions were carried out dropwise during 1 minute for the sodium hydroxide and during 2 minutes for the ferric chloride solution. The additions of NaOH-solution and of ferric chloride solution were made with 2 minute intervals. One minute after addition of the final portion of ferric chloride 0.95 l. of the NaOH-solution was added. The temperature of the reaction mixture was thereafter kept at 80°C. for 35 minutes, still with stirring, wheeeafter the reaction mixture was cooled to 25°C. and diluted to 9.2 l. with distilled water. To the diluted solution 21 l. of 95% ethanol was added during 20 minutes with vigorous stirring, whereafter the stirring continued for 10 minutes. After 60 minutes the mother liquor was sucked off from the deposited precipitate, which thereafter was washed with 4.5 l. 63% ethanol. The washed precipitate was added to 4.20 l. of distilled water at 40°C. in the reaction vessel, whereafter the temperature was raised to 80°C. during 30 minutes. Thereafter the temperature was kept at 80°C. for a further 30 minutes. During all of the dissolution process the rate of stirring was 235 rpm. After cooling to 25°C. the pH was adjusted to 6.8 using 6 N HCL, whereafter the solution was filtered through Seitz 3/1250 and diluted to 6.48 l. To this solution 14.1 l. 95% ethanol was added under stirring for 20 minutes. After stirring for a further 2 minutes, the precipitate was allowed to stand for 15 hours. The precipitate was washed 3 times with 4.5 l. 63% ethanol and 3 times with 4.5 l. 95% ethanol, whereafter it was dried in vacuum at 45°C. yielding 730 g. of dried iron preparation with an iron content of 19.9by weight calculated on the dried preparation.

From the dried preparation an injection solution was prepared similarly as described in Example 15. The total iron content of the resulting injection solution was 56.0 mg/ml; the content of ferrous iron was 1.92 mg/ml; the viscosity of the injection solution was 6.54 cps and the pH was 7.45. The resorption in rabbit after injection of 20 mg. iron per kg. bodyweight was 72% after 24 hours and 93% after 7 days. After 24 hours, 24% of the administered iron had been excreted.

EXAMPLE 19

67.2 g. of polymer (final product) formed from sorbitol, gluconic acid and epichlorohydrin in the same manner set forth in Example 6 and 20 ml. of lactic acid were dissolved in 50 ml. distilled water. A separate solution of 80 g. NaOH in 400 ml. distilled water was prepared. Of this NaOH-solution 40 ml. was added to the solution of polymer and lactic acid. The mixture obtained was heated to 80°C. under stirring, whereafter 9 portions of 24 ml. each of the NaOH-solution were added. After such addition of NaOH-solution, 14 ml. of the ferric chloride solution, which was prepared by dissolving 60 g. $FeCl_3 \cdot 6 H_2O$ in 90 ml. distilled water, was added. The 18 portions of NaOH-solution and ferric chloride solution were added during 25 minutes. Five minutes thereafter 45 ml. of the NaOH-solution was added, whereafter the temperature was kept at 80°C. for a further 35 minutes under continued stirring. Thereafter the mixture was cooled to 25°C. and diluted to 550 ml. with distilled water. To the diluted solution 1,100 ml. 99.5% ethanols was added. After 30 minutes, the mother liquor was sucked off from the deposited precipitate which had formed, and the precipitate was washed with 200 ml. diluted ethanol (ethanol and water in the proportions 2:1). The washed precipitate was added in portions during 15 minutes and under vigorous stirring to 300 ml. of distilled water of temperature 80°C. The temperature was thereafter kept at 80°C. for a further 30 minutes under stirring. Thereafter the solution was cooled to 25°C. and pH of the solution was adjusted to 6.2 using 96 ml. of 2 N HCl. The neutralized solution was filtered through Seitz filter plate No. Ko2. The solution was diluted to 450 ml. with distilled water. To the diluted filtrate 900 ml. 99.5% ethanol was added under vigorous stirring. After 30 minutes the mother liquor was sucked off from the precipitate obtained. The precipitate was allowed to stand for 15 hours. Thereafter the precipitate was dissolved in distilled water in the same way as described above. After cooling and filtering through Seitz 3/1250 the solution was diluted to 350 ml. with distilled water and 700 ml. 99.5 ethanol was added under stirring. After 30 minutes, the mother liquor was sucked off from the deposited precipitate, and the precipitate was washed 3 times with 200 ml. ethanol ml. ethanol and water (in the preportion of 2:1) and 3 times with 99.5% ethanol. The precipitate obtained was dried in vacuum yielding 27.4 g. of dried preparation with an iron content of 27.6% by weight calculated on the dried preparation.

EXAMPLE 20

25.4 g. of the dried iron preparation obtained in Example 19 was added in portions to 130 ml. of distilled water at 80°C. over 15 minutes with stirring. The temperature was kept at 80°C. for further 50 minutes whereafter the solution was cooled to 25°C. The solution was dilutd to 140 ml. After filtering through Seitz filter No. 3/1250 and 0.65 $\mu$ membrane filter, the solution was filled into 10 ml. injection flasks which were sterilized at 120°C. for 20 minutes. The iron solution obtained had a total content of iron of 49.7 mg/ml; a content of ferrous iron of 0.9 mg/ml; a viscosity of 6.1 cps; a freezing point depression of 0.3°C. and a pH of 7.13. The resorption in rabbit after injection of 20 mg. of iron per kg. bodyweight was 56% after 24 hours and 93% after 7 days. The excretion after 24 hours was 9%.

EXAMPLE 21

An amount of polymer corresponding to 40 g. organic dry substance and provided from sorbitol gluconic acid and epichlorohydrin as described in Example 5 was dissolved in 300 ml. of distilled water at room temperature. A solution consisting of 60 g. of $FeCl_3$. $6H_2O$ dissolved in 100 ml. distilled water was mixed with the polymer solution at room temperature. To the mixture thus obtained was added with vigorous stirring 960 ml. 1 M NaOH solution, whereby the temperature of the reaction solution did not exceed 30°C. After 45 minutes at room temperature, the temperature of the mixture was raised to 80°C. The mixture was kept at this temperature during 20 minutes, whereupon it was cooled to room temperature and filtered through Seitz filter plate No. Ko2. The filtrate was diluted to 1500 ml. with distilled water, whereafter 3000 ml. 99.5% ethanol was added with vigorous stirring. After 20 minutes the precipitate formed was filtered and dissolved in a mixture of 600 ml. distilled water, 10 g. of polymer, calculated as organic dry substance, and 20 ml. 1 M NaOH. The temperature was raised to 80°C. and kept there during 25 minutes whereafter the solution was cooled to room temperature. After cooling, the solution was filtered through Seitz filter plate EKS. The filtrate was diluted to 1,000 ml. with distilled water, whereupon 2,000 ml. 99.5% ethanol was added with vigorous stirring. After 90 minutes the precipitate was filtered and redissolved, heated and cooled in the same way once more. To the cooled solution thus obtained 1 M HCl was added slowly and under stirring until the pH of the solution was 7.0, whereafter the solution was diluted with distilled water to 1,000 ml. Thereafter 2,000 ml. 99.5% ethanol was added with stirring. After 60 minutes, the precipitate obtained was filtered and washed, first with 100 ml. ethanol of the same concentration as the mother liquor and then with 100 ml. 75% ethanol. The precipitate was thereafter washed 3 times with 150 ml. 99.5% ethanol, whereafter it was dried in vacuum at 50°C. during 3 hours. Yield: 35.6 g. of dried preparation containing a total amount of 28.8% by weight of iron calculated on the dried iron preparation.

EXAMPLE 22

To a round-bottomed 500 ml. flask provided with stirrer, cooler and thermometer 130 ml. distilled water was added and heated to 80°C. The dried preparation (26.0 g.) obtained as described in Example 16A was added to the distilled water during 10 minutes with stirring. The mixture obtained was kept at 80°C. during 60 minutes calculated from the start of addition of dry preparation. Thereafter the solution was cooled to room temperature and pH was adjusted to about 7.7 with 1 M HCl. The volume of the solution was adjusted to 150 ml. with distilled water whereupon the solution was filtered through Seitz filter plate No. 3/1250 and through 0.6 $\mu$ membrane filter "Milliepore." The filtered solution was filled on ampoules which were sterilized at 120°C. during 20 minutes. The injection solution obtained had a total content of iron of 51.4 mg/ml; a content of ferrous iron of 0.57 mg/ml; a viscosity of 2.87 cps and a pH of 7.84. Resorption of iron in rabbit muscle after 7 days was 91%. After 24 hours, 12% of administered iron had been excreted in the urine.

EXAMPLE 23

Eighty grams of organic dry substance of polymer were synthetized as described in Example 5 and it was dissolved in 600 ml. distilled water. A mixture of 236 ml. 1.88 M $FeCl_3$ solution and 24 ml. distilled water was added. Then 1,440 ml. 2N NaOH was added during 60 minutes with vigorous stirring at room temperature. After the NaOH solution was added, the solution was kept at room temperature for another 90 minutes with stirring. The solution was filtered through Seitz filter plate No. 3/1250. The filtrate was diluted to 2,400 ml. and 5,600 ml. 95% ethanol was added during 20 min. with vigorous stirring whereafter the slurry was kept under stirring for 10 minutes. After 80 min. the precipitate was filtered and dissolved with stirring in a mixture of 1,200 ml. distilled water, 20 g. of polymer calculated as organic dry substance and 40 ml. 1N NaOH. The solution was kept at room temperature with stirring for 90 minutes. Then 1 M HCl was slowly added to the solution with stirring until the pH of the solution was 6.8. The solution was filtered through Seitz filter plate EKS. The filtrate was diluted to 2,000 ml. with distilled water; thereupon 4,460 ml. 95% by volume ethanol was added over 20 minutes with vigorous stirring. The slurry was kept for 2 minutes with stirring. After 16 hours the precipitate was filtered and washed first with 200 ml. 63% by volume ethanol and then with 200 ml. 71% by volume ethanol. The precipitate was then washed 3 times with 300 ml. 95% by volume ethanol whereafter it was dried in vacuum at 40°C. for 12 hours.

The yield was 65.2 g. of dry substance containing average total amount of 27.5% by weight of iron.

EXAMPLE 24

To a round-bottomed 500 ml. flask provided with stirrer, cooler and thermometer, 230 ml. distilled water was added and heated to 80°C. Then 48.2 g. of the preparation obtained in Example 23 was added to the distilled water over 15 min. with stirring. The mixture obtained thereby was kept at 80°C. for 65 minutes calculated from the start of addition of dry preparation. The solution was cooled to 25°C. and diluted to 250 ml. Subsequently, it was filtered through Seitz filter plate No. 3/1250 and then through 0.65 $\mu$ membrane filter "Millipore" fitted with A.P. prefilter No. 25 12725. The filtered solution was used to fill ampoules which were sterilized at 120°C. for 20 minutes.

The injection solution obtained had a total content of iron of 50.6 mg/ml, a content of ferrous iron of 1.21 mg/ml, a viscosity of 2.94 cps. and a pH 6.78. Resorption of iron in rabbit muscle after 7 days was 83%. After 24 hours 14% of the administered iron had been excreted in the urine.

EXAMPLE 25

The polymer of Example 23 (80 g.) was dissolved in 600 ml. distilled water. A mixture of 236 ml. 1.88 M $FeCl_3$ and 24 ml. distilled water was added and the solution was cooled to a temperature of 4°C. Then 2,880 ml. of 1N NaOH solution of 4°C. was added with vigorous stirring for 60 minutes. The reaction mixture was held at temperatures between 4 and 9°C. by cooling in an icebath. After the NaOH solution was added, the solution was kept at 4°C. for 60 minutes with stirring. The temperature was raised to 25°C. The solution was filtered subsequently through Seitz filter plate No. 3/1250 and diluted to 3.800 ml. Then 8,860 ml. 95% ethanol was added over 20 minutes with vigorous stirring, whereafter the slurry was stirred for 10 minutes. After 75 minutes the precipitate was filtered and dissolved in a mixture of 1,200 ml. distilled water, 20 g. of polymer calculated as organic dry substance and 40 ml 1N NaOH. The temperature was raised to 80°C. during 30 minutes. Thereafter the solution was cooled to 25°C. Subsequently, 1M HCl was slowly added to the solution with stirring until the pH of the solution was 6.8. The solution was filtered through Seitz filter plate EKS. The filtrate was diluted to 2,000 ml. with distilled water, and 4,460 ml. 95% by volume. ethanol was then added over 20 minutes with vigorous stirring. The slurry was stirred for 2 minutes. After 16 hours the precipitate was filtered and washed first with 200 ml. 63% by volume ethanol and then with 200 ml. 71% by volume ethanol. The precipitate was washed subsequently 3 times with 2 95% by volume ethanol, and thereafter it was dried in vacuum at 40°C. for 12 hours.

The yield was 71 g. dry substance containing a total amount of 27.9% by weight of iron.

EXAMPLE 26

To a round-bottomed 500 ml. flask provided with stirrer, cooler and thermometer 170 ml. distilled water was added and heated to 80°C. Then 39.3 g. of the preparation obtained in Example 25 was added over 15 minutes with stirring. The mixture obtained was maintained at 80°C. for 65 minutes calculated from the start of addition of dry preparation. The solution was cooled to 25°C. and diluted to 200 ml. Thereafter it was filtered through Seitz filter plate No. 3/1250 and through 0.65 $\mu$ membrane filter "Millipore" fitted with A.P. prefilter No. 2,512,725. The filtered solution was then put into ampoules which were sterilized at 120°C. for 20 minutes.

The injection solution obtained had a total content of iron of 49.8 mg/ml, a content of ferrous iron of 0.8 mg/ml. a viscosity of 3.03 cps. and a pH 7.84. Resorption of iron in rabbit muscle after 7 days was 86%. After 24 hours 20% of the administered iron had been excreted in the urine.

EXAMPLE 27

In a round-bottomed flask, col. 1 l., provided with stirrer, droppng funnel, thermometer and cooler, were added at 45°C.:

60 ml. distilled water
g. NaOH
69 g. potassium arabonate
120 g. sorbitol

Them 100 ml. epichlorohydrin were added continuously during 26 minutes. The temperature was raised to 75°C. over 15 minutes calculated from the start of addition of epichlorohydrin. After 95 minutes from the start of addition of epichlorohydrin, the temperature was raised to 85°C. and maintained at that level until 205 minutes had elapsed since the start of epichlorohydrin addition. Thereafter, the temperature was lowered to 75°C. and the temperature was kept there during the remaining part of the polymerization which was performed with effective stirring.

The following reagents were added in portions according to the following tabulation: 65 g. NaOH was dissolved in 88 ml. and 36 ml. epichlorohydrin.

| Time (min.) | Ml Epichlorohydrin (ml.) | Ml NaOH-solution (ml.) |
|---|---|---|
| 45 |  | 2.8 |
| 55 |  | 2.8 |
| 65 |  | 5.6 |
| 75 |  | 5.6 |
| 85 |  | 5.6 |
| 95 |  | 5.6 |
| 105 |  | 5.6 |
| 115 | 20 | 5.6 |
| 125 |  | 5.6 |
| 135 |  | 5.6 |
| 145 |  | 5.6 |
| 155 |  | 5.6 |
| 165 |  | 5.6 |
| 175 |  | 5.6 |
| 185 | 16 |  |
| 195 |  | 5.6 |
| 205 |  | 5.6 |
| 215 |  | 7.0 |

After 260 minutes from the start of the first addition of epichlorohydrin, the reaction mixture was cooled to 60°C. While cooling continually to room temperature, the pH was adjusted to 0.6 using 6 M HCl. The mixture was diluted with distilled water to 450 ml., and 1,125 ml. of ethanol, 99.5%, was then added with stirring. The next day the mother liquor was sucked off and the precipitated syrup which contained crystals was filtered. The remainder on the filtrum was washed with ethanol diluted to the same concentration as the mother liquor. The washing liquor was carefully mixed with the filtrate. In all, 51 ml. of distilled water was added, including the water contained in the washing liquor. Then 510 ml. 99,5% ethanol was added, that is, 2 volumes of the undiluted filtrate. After 45 minutes the mother liquor was sucked off and the precipitated syrup, volume 200 ml., was mixed with 40 ml. of distilled water. Subsequently 400 ml. 99.5% ethanol was added with stirring. The mixture was allowed to stand for 30 minutes; whereafter, the mother liquor was sucked off. The precipitated syrup was washed twice each time using 100 ml. 99.5% ethanol, and five times using 100 ml. of acetone. The washed syrup was dried in vacuo during two hours at about 50°C. It was thereafter diluted with distilled water to 181 g.

The product was analyzed as follows:

Analysis
| | |
|---|---|
| Loss of weight at drying | 21.6% |
| Contents of $K^+$ | 2.0% calculated on dried sample |
| Contents of $Na^+$ | 2.9% calculated on dried sample |
| Contents of $Cl^-$ | 6.0% calculated on dried sample |

EXAMPLE 28

An amount of polymer prepared in Example 27, corresponding to 50 g. of organic dry substance, was dissolved in 300 ml. distilled water at room temperature. A solution containing 60 g. $FeCl_3$. 6 $H_2O$ dissolved in 100 ml. distilled water was mixed with the polymer solution at room temperature. To the mixture thus obtained was added with vigorous stirring 1440 ml. 1M NaOH, and the temperature was not allowed to exceed 30°C. After 45 min. at room temperature, the temperature of the mixture was raised to 80°C. The temperature of the mixture was kept at 80°C. for 20 min.

whereupon it was cooled to room temperature and filtered through Zeiss filter plate No. Ko2. The filtrate was eluted to 2,000 ml. with distilled water, and thereafter 6,000 ml. 99.5% ethanol was added with vigorous stirring. After 20 min., the precipitate obtained was filtered off and dissolved in a mixture of 600 ml. distilled water, 12.5 g. polymer (calculated as organic dry substance) and 20 ml. 1M NaOH. The temperature was thereafter raised to 80°C. It was maintained at that level for 25 minutes, and the solution was then cooled to room temperature. To the cooled solution, 1M HCl was added with vigorous stirring until the solution had a pH of 7. The solution was thereafter diluted to 1000 ml. with distilled water, and 2,000 ml. 99.5% ethanol was added subsequently with vigorous stirring. After 60 min. the precipitate obtained was filtered off and washed with 100 ml. ethanol diluted to the same concentration as the mother liquor, and thereafter it was washed three times with 150 ml. 99.5% ethanol. The washed precipitate was dried in vacuum at 50°C. for 3 hours.

The yield was 42.6 g. of product containing 26.6% of Fe calculated on the original sample.

EXAMPLE 29

To a round-bottomed flask, volume 500 ml, provided with stirrer, thermometer and cooler, 130 ml. distilled water was added and heated to 80°C. Then 28.2 g. of the dry iron preparation of Example 28 was added to the water over 10 min. with stirring. The temperature of the mixture was kept at 80°C. for 65 min. calculated from the start of addition of the dry iron preparation. The solution obtained was cooled to room temperature. The pH was adjusted to 7.3 using 1M HCl, and the volume was adjusted to 150 ml. with distilled water. The solution was thereafter filtered through Seitz filter plate 3/1250 and through Pyrex glass filter. The filtrate obtained was then placed into ampoules and autoclavated at 120°C. for 20 minutes.

The analysis is as follows:

| | |
|---|---|
| Total amount of Fe | 50.7 mg/ml |
| Amount of $Fe^{2+}$ | 0.46 mg/ml |
| Viscosity | 5.8 cps. |
| pH | 8.0 |
| Resorption of Fe from muscle rabbit after 7 days | 89% |
| Excretion of Fe in urine of rabbit during the first 24 hours after the injection | 1% |

EXAMPLE 30

An amount of polymer prepared from sorbitol, gluconic acid and epichlorohydrin in the same way as described in Example 5, corresponding to 70 g. organic dry substance, was dissolved in 200 ml. of distilled water. A solution consisting of 106.7 g. $Fe_2(SO_4)_3 \cdot (NH_4)_2SO_4 \cdot 24 H_2O$ in 200 ml. of distilled (28–30% $NH_3$), was added with vigorous stirring to the resulting solution. Thereafter an additional amount of 500 ml. diluted ammonium hydroxide solution, containing 250 ml. of the above mentioned concentrated solution, was added, Finally 100 ml. of the concentrated ammonium hydroxide solution was added. After 65 minutes at room temperature, the temperature of the mixture was raised to 60°C. The mixture was kept at this temperature of 20 minutes. Then it was cooled to room temperature and filtered through Seitz filter plate No. 3/1250. The filtrate was diluted to 2,000 ml. with distilled water, and subsequently 4,000 ml. ethanol (99.5%) was added with vigorous stirring.

After 20 minutes, the precipitate obtained therefrom was separated by filtration and washed with 3×150 ml. ethanol, diluted to the same concentration as the mother liquor, with 200 ml ethanol diluted to 75%, and finally with 200 ml ethanol (99.5%). The washed precipitate was dissolved in a mixture of 600 ml distilled water, 17.5 g polymer (organic dry substance) and 20 ml 1M NaOH. The temperature was raised to 60°C. It was kept at this temperature for 25 minutes, and the solution was then cooled to room temperature. To the cooled solution 2M HCl was added with vigorous stirring until the pH was 6.3. The solution was filtered through Seitz filter plate Ko2, 3/1250 and EKS. The filtrate was diluted to 1000 ml with distilled water. Then 2,000 ml ethanol (99.5%) was added with vigorous stirring. The resulting precipitate was filtered, washed with 100 ml ethanol, diluted to the same concentration as the mother liquor, with 100 ml ethanol diluted to 75%, and finally with 3×150 ml ethanol (99.5%). The washed precipitate was dried in a vacuum at 50°C.

The yield was 47.2 g. The iron content was 21.9% calculated on the original sample.

EXAMPLE 31

An amount of polymer prepared from sorbitol, gluconic acid and epichlorohydrin in the same way as described for Example 5, corresponding to 70 g organic dry substance, was dissolved in 200 ml of distilled water. A solution consisting of 50 g $Fe_2(SO_4)_3 \cdot X H_2O$ (corresponding to 12.4 g iron) and 200 ml of distilled water was mixed with the polymer solution at room temperature. To the mixture thus obtained 750 ml diluted ammonium hydroxide, containing 75 ml of a concentrated (28–30% $NH_3$) ammonium hydroxide solution, was added with vigorous stirring. Thereafter 500 ml diluted ammonium hydroxide solution, containing 250 ml of the above mentioned concentrated solution, was added. Finally 100 ml of the concentrated ammonium hydroxide solution was added. After 70 minutes at room temperature, the mixture was heated to 60°C. The mixture was kept at this temperature for 20 minutes. Then it was cooled to room temperature and filtered through a Seitz filter plate No Ko2. The filtrate was diluted to 2,000 ml with distilled water, and subsequently 4,000 ml ethanol (99.5%) was added with vigorous stirring. After 30 minutes, the precipitate obtained was separated by filtration and washed with 3×150 ml ethanol (diluted to the same concentration as the mother liquor), with 200 ml ethanol diluted to 75% and finally with 200 ml ethanol (99.5%). The washed precipitate was dissolved in a mixture of 600 ml distilled water, 17.5 g polymer (organic dry substance) and 20 ml 1M NaOH. The temperature was raised to 60°C and it was maintained at this temperature for 25 minutes. The solution was then cooled to room temperature. To the cooled solution 2M HCl was added with vigorous stirring until pH was 6.3. The solution was filtered through Seitz filter EKS. The filtrate was diluted to 1,000 ml with distilled water, and 2000 ml ethanol (99.5%) was then added with vigorous stirring. The precipitate therefrom was filtered and washed with 100 ml ethanol, diluted to the same concentration as the mother liquor, with 100 ml ethanol diluted to 75% and finally with 3×150 ml ethanol (99.5%). The washed precipitate was dried in vacuum at 50°C.

The yield was 41.5 g and the iron content was 22.7% calculated on the original sample.

EXAMPLE 32

To a round-bottomed flask provided with stirrer, dropping funnel, thermometer, and reflux cooler was added at 45°C:

60 ml distilled water
24 g NaOH
60 g gluconic acid lactone
120 g hydroxypropylsorbitol (Atlas No. G-2401 containing about 84 % by weight dry substance.

Then 80 ml epichlorohydrin was added continuously over 45 minutes. The temperature was raised to 75°C over 20 min. calculated from the start of addition of epichlorohydrin. After 165 min. the temperature was raised to 85°C. It kept there until 300 min. has lapsed and it was then lowered to 75°C. The temperature of 75°C was thereafter maintained during the remainder of the polymerization which was conducted with effective stirring.

The following reagents were added in portions to the table herebelow: 34 g NaOH in solid form, 20.2 g NaOH dissolved in distilled water to a volume of 28 ml and 36 ml epichlorohydrin.

| Time (min) | Epichlorohydrin (ml) | NaOH (g) | NaOH (ml solution) |
|---|---|---|---|
| 60 | | 2 | |
| 75 | | 2 | |
| 90 | | 2 | |
| 120 | | 4 | |
| 150 | | 4 | |
| 165 | | 4 | |
| 180 | 20 | 4 | |
| 195 | | 4 | |
| 210 | | 4 | |
| 225 | | 4 | |
| 240 | | | 5.6 |
| 255 | | | 5.6 |
| 270 | 16 | | |
| 185 | | | 5.6 |
| 300 | | | 5.6 |
| 315 | | | 5.6 |

After 415 min. from the start of addition of epichlorohydrin, the reaction mixture was cooled to 60°C. During continuous cooling to room temperature, 20 min. 4M HCl was added and thereafter 6M HCl was added until the pH was 0.9. The reaction mixture, which contained crystals, was filtered. The solid remainding on the filtrum was washed with 20 ml ethanol diluted with one part of water. The washing liquid and 10 ml distilled water were mixed with the filtrate, whereupon 1050 ml of 99.5 % ethanol was added with stirring. On the next day the precipitated crystals were filtered off and washed with 50 ml ethanol diluted to the same concentration as the mother liquor. The washing liquid was mixed with the filtrate, and 0.5 volumes of chloroform was then added with stirring. After 30 min. two phases had formed. The heavier phase was separated and mixed with 0.5 volumes of 99.5 % ethanol and 1/6 volume of chloroform. Two phases were formed which were separated after 2 hours. The heavy phase water was mixed with 1/10 volume of water, 1/2 volume of 99.5 % ethanol, and 1/6 volume of chloroform. The heavier of the two phases formed therefrom was separated after 2 hours. Its volume was 190 ml. The separated phase was washed 5 times with 95 ml acetone and dried in vacuum in order to remove the rest of the acetone. The dried product was diluted with 10 ml distilled water in order to achieve a suitable consistency.

The yield was 118 g. The analysis is as follows:

| Loss of weight at drying | 20.6% |
| Contents of $Na^+$ | 5.9 % calculated on dry sample |
| Contents of $Cl^-$ | 8.8 % calculated on dry sample |

EXAMPLE 33

The polymer of Example 32, corresponding to 40 g. organic dry substance, was dissolved in 300 ml. distilled water at room temperature. A solution containing 60 g. $FeCl_3 \cdot 6 H_2O$ dissolved in 100 ml. distilled water was mixed with the polymer solution at room temperature. To the mixture obtained was added under vigorous stirring 1,440 ml. of 1M NaOH. After 60 min. at room temperature, the temperature of the mixture was raised to 80°C. The mixture was kept at this temperature for 20 minutes. It was then cooled to room temperature and filtered through Seitz filter plate Ko2. The filtrate was diluted to 2,000 ml. with distilled water; thereafter, 4,000 ml. 99.5% ethanol was added with vigorous stirring. The precipitate thus obtained was filtered off and dissolved in a mixture of 400 ml. distilled water, 10 g. of the polymer (calculated as organic dry substance) and 20 ml. 1M NaOH. The temperature was raised to 80° C. and kept there during 25 minutes. The solution was then cooled to room temperature. To the cooled solution 1M HCl was added with vigorous stirring until the pH was 6.4. The solution was filtered through Seitz filter plate EKS. The filtrate was diluted with distilled water to 600 ml. whereupon 1,200 ml. 99.5% ethanol was added with vigorous stirring. The precipitate obtained was filtered off and washed with 100 ml. ethanol (diluted to the same concentration as the mother liquor), with 100 ml. ethanol diluted to 75% and finally 3 times with 150 ml. 99.5% ethanol. The washed precipitate was dried in vacuum at 50°C.

The yield was 28.6 g. The total contents of iron was 35.6% calculated on the original sample.

EXAMPLE 34

To a round-bottomed flask provided with stirrer, thermometer and cooler was added 130 ml. distilled water which was heated to 80°C. Then 21.1 g. dry iron preparation of Example 33 was added to the water over 5 minutes with stirring. The temperature of the mixture was kept at 80°C. for 60 minutes calculated from the start of addition of the dry iron preparation. The solution obtained therefrom was cooled to room temperature; thereafter, it was diluted with distilled water to 150 ml. The solution was then filtered through Seitz filter plate 3/1250 and through membrane filter Millipore 0.65 $\mu$. The filtrate was used to fill ampoules and autoclavated at 120°C. during 20 minutes.

| Analysis: | |
|---|---|
| Total amount of iron | 51.1 mg/ml |
| Amount of ferrous iron | 1.38 mg/ml |
| Viscosity | 1.8 cps |
| pH | 7.4 |
| Resorption of iron from rabbit muscle after 7 days | 56% |
| Excretion of iron in urine of rabbit during the first 24 hours after the injection | 12% |

EXAMPLE 35

To a 3 l. round-bottomed flask provided with stirrer, dropping funnel, thermometer and cooler were added at 40°C.

75 ml. distilled water
30 g. NaOH
75 g. glyconic acid lactone
150 g. pentaerythritol The temperature of the mixture was raised to 75°C. After 120 minutes from the start, the temperature was raised to 85°C. and again lowered to 75°C. at 185 minutes after start.

Then 100 ml. epichlorohydrin was added for 55 minutes. In addition 25 ml. of the same were added at 135 minutes after start and 20 ml. were added at 165 minutes after start. Subsequently, 75 g. NaOH was dissolved in distilled water to form a final volume of 300 ml. The resulting NaOH solution was added in portions of 10 ml. at 90.95 and 100 minutes, in portions of 20 ml. at 105, 115, 120, 125, 130, 145, 150, 155, 160, 180, 185, 190 and 195 minutes and finally in a portion of 10 ml. at 200 minutes after start, i.e., the start of the addition of the first portion of epichlorohydrin.

After 210 minutes the reaction mixture was cooled to room temperature, and 6M HCl was added until the pH was 0.7. The solution was diluted to 1050 ml. using distilled water, and 2,625 ml. ethanol (99.5%) was added with vigorous stirring. The mixture was allowed to separate overnight. The precipitated white and crystalline solid phase was separated from the clear mother liquor by filtration. The mother liquor was evaporated in vacuum to 600 ml. and 1M NaOH was added until the pH was 1.0. The evaporation was continued until the volume was about 280 ml. The salt crystals, which were precipitated during the evaporation, were filtered and washed with ethanol of the same concentration as the mother liquor. The washing liquor was mixed with the filtrate, and 30 ml. distilled water was added. To the mixture thus obtained 825 ml. ethanol (99.5%) and 412 ml. chloroform were added. Two phases were formed. The heavier phase was separated and was allowed to stand overnight. The precipitated salt crystals were then removed by filtration. The crystals were washed with diluted ethanol (5 parts of 99.5% ethanol and 1 part of distilled water). The washing liquor was mixed with the filtrate giving a total volume of 245 ml. Then 5 ml. ethanol (99.5%) and 70 ml. chloroform were added whereupon two phases were formed. The heavier phase (volume 140 ml) was separated and mixed with 5 ml. distilled water, 70 ml. ethanol (99.5%) and 85 ml. chloroform. Two phases were formed. The heavier phase was separated and washed three times with one volume of acetone and dried in vacuum to remove traces of acetone. The dried product was diluted with 25 ml. distilled water to obtain a more easier handled syrup.

The yield was 80 g. The analysis is as follows:

| | |
|---|---|
| Weight loss at drying | 29.5% |
| Contents of Na$^+$ | 4.1% w/w |
| Contents of Cl$^-$ | 6.5% w/w |

EXAMPLE 36

An amount of polymer in Example 35, corresponding to 40 g. organic dry substance, was dissolved in 300 ml. distilled water at room temperature. A solution containing 60 g. FeCl$_3$·6H$_2$O, dissolved in 100 ml. distilled water, was mixed with the polymer solution at room temperature. To the mixture thus obtained was added with vigorous stirring 1,440 ml. 1M NaOH solution, whereby the temperature of the reaction mixture was not allowed to exceed 30°C. After 55 minutes at room temperature, the temperature of the mixture was raised to 80°C. The mixture was kept at this temperature for 20 minutes. It was then cooled to room temperature and filtered through Seitz filter plate Ko2. The filtrate was diluted to 2,000 ml. with distilled water. Subsequently, 4,000 ml. 99.5% ethanol was added with vigorous stirring. After 90 minutes the precipitate formed was filtered off and dissolved in a mixture of 400 ml. of distilled water, 10 g. polymer (calculated as organic dry substance) and 20 ml. 1M NaOH. The temperature was raised to 80°C. and kept there for 25 minutes. The solution was then cooled to room temperature. To the resulting cooled solution 1M HCl was slowly added with stirring until the pH of the solution was 6.4. Thereafter the solution was filtered through Seitz filter plate EKS. The filtrate was diluted to 600 ml. with distilled water. Then 1,200 ml. 99.5% ethanol was added with vigorous stirring. After 18 hours the precipitate obtained therefrom was filtered and washed first with 100 ml. ethanol of the same concentration as the mother liquor and thereafter with 100 ml. 75% ethanol. The precipitate was thereafter washed three times with 150 ml. 99.5% ethanol. Thereafter, it was dried in vacuum at 50°C. for 3 hours.

The yield was 33.1 g. dried preparation containing a total amount of 35.0% by weight of iron.

EXAMPLE 37

To a 500 ml. round-bottomed flask provided with stirrer, cooler and thermometer was added 130 ml. distilled water which thereafter was heated to 80°C. Then 21.5 g. of dried iron preparation of Example 36 was added to the distilled water over 10 minutes with stirring. The mixture obtained therefrom was kept at 80°C. for 60 minutes, calculated from the start of addition of dried iron preparation. Thereafter the solution was cooled to room temperature. The pH was 7.4. The volume of the solution was adjusted to 150 ml. with distilled water, and the solution was then filtered through Seitz filter plate No. 1250 and through 0.6 μ membrane filter Millipore. The filtered solution was put into ampoules which were sterilized at 120°C. for 20 minutes.

The resulting injection solution contained a total amount of 51.3 mg/ml iron and 0.91 ml. ferrous iron; the viscosity of the solution was 1.7 cps. and the pH of the solution was 7.45. The resorption of iron in rabbit muscle after 7 days was 71%. After 24 hours 24% of the administered iron had been excreted in the urine.

EXAMPLE 38

To a round-bottomed flask provided with stirrer, dropping funnel, thermometer and cooler was added at 50°C.:

30 ml. distilled water
12 g. NaOH
30 g. gluconic acid lactone
60 g. dulcitol

The 40 ml. epichlorohydrin was added continuously over 48 minutes. The temperature was raised to 75°C. for 30 minutes and kept there until after 165 minutes. Subsequently, the temperature was raised to 85°C. After 300 minutes, the temperature was lowered to 75°C. The time is calculated from the start of addition of epichlorohydrin.

The polymerization was carried out in effective stirring. Besides the reagents listed above, the following were added:

17 g. NaOH in solid form 10.1 g. NaOH dissolved in distilled water to 14 ml.
18 ml. epichlorohydrin The addition was carried out portionwise according to the following table:

| Time (min.) | Epichlorohydrin (ml.) | NaOH solid form (g.) | NaOH solution (ml.) |
|---|---|---|---|
| 60 | | 1 | |
| 75 | | 1 | |
| 90 | | 1 | |
| 120 | | 2 | |
| 150 | | 2 | |
| 165 | | 2 | |
| 180 | 10 | 2 | |
| 195 | | 2 | |
| 210 | | 2 | |
| 225 | | 2 | |
| 240 | | | 2.8 |
| 255 | | | 2.8 |
| 270 | 8 | | |
| 285 | | | 2.8 |
| 300 | | | 2.8 |
| 315 | | | 2.8 |

At 415 minutes from the start of the addition of epichlorohydrin, the reaction mixture was cooled to 60°C. Then 5 ml. 4M HCl was added slowly with continuous cooling and stirring. Thereafter, 6M HCl was added until the pH was 0.9. The acidified reaction mixture was filtered. The remainder on filtrum was washed with 10 ml. ethanol diluted with one volume of water. The washing liquid was mixed with the filtrate which thereafter was diluted with water to a volume of 200 ml. excluding the volulme of the ethanol contained in the washing liquid. Then 500 ml. 99.5% ethanol was added with stirring and the mixture was allowed to stand overnight. The mother liquor was decanted and the remainder, which consisted of a syrup containing crystals, was filtered. The remainder on filtrum was washed with 30 ml. ethanol, diluted to the same concentration as the mother liquor. The washing liquid was mixed with the filtrate, the original volume of which was 93 ml. Then 9 ml. water and 186 ml. 99.5% ethanol were added. After 90 minutes, the mother liquor was decanted from the syrup (volume 60 ml.) which had formed. The syrup was mixed with 12 ml. water and 120 ml. 99.5% ethanol. The mixture was allowed to stand for 30 minutes. The mother liquor was decanted and the syrup (volume 55 ml.) was mixed with 11 ml. water and 110 ml. 99.5% ethanol. It dried subsequently in vacuum at 40°C. for 45 minutes in order to remove the ethanol. The dried product was diluted with water to 46 g. of polymer.

The analysis of the product is as follows:

| | |
|---|---|
| Loss of weight at drying | 19.4% |
| Contents of Na$^+$ | 3.5% calculated on dried sample |
| Contents of Cl$^-$ | 5.2% calculated on dried sample |

EXAMPLE 39

An amount of polymer of Example 38, corresponding to 20 g. organic dry substance, was dissolved in 150 ml. distilled water at room temperature. A solution containing 30 g. $FeCl_3 \cdot 6H_2O$ dissolved in 50 ml. distilled water was mixed with the polymer solution at room temperature. To the mixture obtained was added with vigorous stirring 720 ml. 1M NaOH. After 65 minutes at room temperature, the temperature of the mixture was raised to 80°C. The mixture was kept at 80°C. during 20 minutes. It was then cooled to room temperature and filtered through Seitz filter plate Ko2. The filtrate was diluted to 100 ml. with distilled water and 2,000 ml. 99.5% ethanol was then added with vigorous atirring. The precipitate obtained was filtered off and dissolved in a mixture of 300 ml. distilled water, 6.8 g. polymer (calculated as organic dry substance) and 10 ml. 1M NaOH. The temperature was raised to 80° C. and kept there during 20 minutes. The solution was then cooled to room temperature. To the cooled solution was added 1M HCl with vigorous stirring until the pH was 6.4. The solution obtained was filtered through Seitz filter plate EKS. The filtrate was diluted with distilled water to 500 ml.; thereafter, 100 ml. 99.5% ethanol was added with vigorous stirring. After 120 minutes, the precipitate obtained therefrom was filtered off and washed with 50 ml. ethanol (diluted to the same concentration as the mother liquor), with 50 ml. ethanol diluted to 75% and finally three times with 75 ml. 99.5% ethanol. The washed precipitate was dried in vacuum at 50°C.

The yield was 20.5 g. The total amount of iton was 30.3%.

EXAMPLE 40

To a round-bottomed flask (volume 500 ml) provided with stirrer thermometer and cooler was added 95 ml. distilled water which was heated to 80°C. Then 18.2 g. of dry iron preparation of Example 39 was added to the water over 5 minutes with stirring. The temperature of the mixture was kept at 80°C. for 60 minutes calculated from the start of addition of the dry iron preparation. The solution obtained was cooled to room temperature. It was then diluted with distilled water to 110 ml. The solution was thereafter filtered through Seitz filter plate 3/1250 and through membrane filter Millipor 0.65 $\mu$. The filtrate was poured into ampoules which were autoclavated at 120°C. during 20 minutes.

| Analysis: | | |
|---|---|---|
| Total contents of iron | 50.2 mg/ml | |
| Contents of ferrous iron | 0.8 mg/ml | |
| Viscosity | 3.0 cps | |
| pH | 7.8 | |
| Resorption of iron from rabbit muscle after 7 days | | 89% |
| Excretion of iron in rabbit urine during the first 24 hours after the injection | | 13% |

EXAMPLE 41

To a round-bottomed flask provided with stirrer, dropping funnel, thermometer and cooler was added at 45°C.:

150 ml. distilled water
60 g. NaOH
150 g. gluconic acid lactone
300 g. mannitol

Then 350 ml. epichlorohydrin was added continuously over 50 minutes. The temperature was raised to 85°C. over 60 minutes calculated from the start of addition of epichlorohydrin. The polymerization was carried out with effective stirring. Besides the above mentioned reagents, the following amount of NaOH and epichlorohydrin was added:

161 g. NaOH in solid form 50.6 g. NaOH dissolved in distilled water to 70 ml.
90 ml. epichlorohydrin The addition was carried out portion wise according to the following table:

| Time (min.) | Epichlorohydrin (ml.) | NaOH Solid Form (g) | NaOH Solution (ml.) |
|---|---|---|---|
| 60 | | 5 | |
| 75 | | 10 | |
| 90 | | 12 | |
| 105 | | 18 | |
| 120 | | 18 | |
| 135 | | 18 | |
| 150 | | 20 | |
| 165 | | 20 | |
| 180 | 50 | | |
| 182 | | 10 | |
| 195 | | 10 | |
| 210 | | 10 | |
| 225 | | 10 | |
| 240 | | | 14 |
| 255 | | | 14 |
| 270 | 40 | | |
| 285 | | | 14 |
| 300 | | | 14 |
| 315 | | | 14 |

After 430 minutes from the start of the first addition of epichlorohydrin, the reaction mixture was cooled to 60°C. Then 25 ml. 4M HCl was added until the pH was 0.4. The acidified reaction mixture was filtered. The remainder on filtrum was washed with 100 ml diluted ethanol (one part ethanol and one part distilled water). The washing liquid was mixed with the filtrate which was diluted with distilled water to a volume of 1,025 ml. excluding the ethanol contained in the washing liquid. Then 2,560 ml. 99.5% ethanol was added with stirring, and the mixture was allowed to stand over night. The mother liquor was decanted and the remainder, which consisted of a syrup containing crystals, was filtered off. The remainder on filtrum was washed with 75 ml. ethanol diluted with water to the same concentration as the mother liquor. The washing liquid was mixed with the filtrate whose original volume was 750 ml. Then 150 ml. distilled water and 1500 ml. 99.5% ethanol were added during stirring. After 60 minutes the mother liquor was decanted leaving the syrup which had formed (volume 370 ml.). The syrup was mixed with 74 ml. distilled water and 740 ml. ethanol (99.5%). The mixture was allowed to stand for 30 minutes. The mother liquor was decanted and the syrup (volume 320 ml.) was mixed with 32 ml) was mixed with 32 ml. distilled water and 160 ml. 99.5% ethanol. After 60 minutes the mother liquor was decanted and the syrup was washed with 2×160 ml. 99.5% ethanol and with 5×160 ml. acetone. The washed syrup was dried in vacuum at 45°C. over 2 hours in order to remove the rest of the acetone. The dried product was thereafter diluted with distilled water to 271 g. in order that a product with a suitable consistency is obtained. The polymer thus obtained was analyzed as follows:

| | |
|---|---|
| Loss of weight at drying | 19.9% |
| Contents of $Na^+$ | 3.1% calculated on dried sample. |
| Contents of $Cl^-$ | 4.5% calculated on dried sample. |

EXAMPLE 42

The polymer of Example 41, corresponding to 40 g. organic dry substance, was dissolved in 300 ml. distilled water at room temperature. A solution containing 60 g. $FeCl_3.6H_2O$ dissolved in 100 ml. distilled water was mixed with the polymer solution at room temperature. To the mixture obtained therefrom was added with vigorous stirring 1,440 ml. 1M NaOH. After 75 minutes at room temperature, the temperature of the mixture was raised to 80°C. The mixture was kept at this temperature for 20 minutes. It was then cooled to room temperature and filtered through Seitz filter plate 3/1250. The filtrate was diluted to 1930 ml. with distilled water; thereafter 3,860 ml. 99.5% ethanol was added with vigorous stirring. The precipitate obtained was filtered off and dissolved in a mixture of 600 ml. distilled water, 5.5 g. polymer (calculated as organic dry substance) and 20 ml. 1M NaOH. The temperature was raised to 80°C. and kept there for 35 minutes. The solution was then cooled to room temperature. To the cooled solution was added 2M HCl with vigorous stirring until the pH was 6.9. The solution was filtered through Seitz filter plate EKS. The filtrate was diluted with distilled water to 1,000 ml. Subsequently, 2,000 ml. 99.5% ethanol was added with vigorous stirring. The precipitate obtained therefrom was filtered off and washed with 100 ml. ethanol (diluted to the same concentration as the mother liquor), with 100 ml. ethanol diluted to 75% and finally three times with 150 ml. 99.5% ethanol. The washed precipitate was dried in vacuum at 50°C.

The yield was 36.2 g. The total contents of Fe was 29.3% calculated on the original sample.

EXAMPLE 43

To a round-bottomed flask provided with stirrer, thermometer and cooler was added 100 ml. distilled water which was heated to 80°C. Then 17.05 g. of dry iron preparation of Example 42 was added to the water over 5 minutes with stirring. The temperature of the mixture was kept at 80°C. for 55 minutes calculated from start of addition of the dry iron preparation. The solution thus obtained was cooled to room temperature; the pH was then adjusted to 7.1 with 2M HCl. The solution was thereafter filtered through Seitz filter plate 3/1250 and through filter Millipore 0.65 μ. The filtrate was employed to fill ampoules which were autoclavated at 120°C. during 20 minutes.

| Analysis: | |
|---|---|
| Total content of Fe | 45.4 mg/ml |
| Total content ferrous iron | 0.4 mg/ml |
| Viscosity | 2.9 cPs |
| pH | 7.4 |
| Resorption of iron from rabbit muscle after 7 days | 94% |
| Excretion of iron in rabbit urine during the 24 hours after the injection | 2% |

EXAMPLE 44

To a 3.1 round-bottomed flask provided with stirrer, dropping funnel, thermometer and cooler were added at about 40°C.:

150 ml. distilled water
  60 g. NaOH
  150 g. gluconic acid lactone (99.5%)
  300 g. glycerol (99.5%)

The temperature was raised to 75°C. and this temperature was maintained during the whole synthesis. Then 400 ml. epichlorohydrin was added in portions of 50 ml. at 0, 15, 90, 150, 210, 255, 300 and 330 minutes after the time of the first addition of epichlorohydrin. Every addition was performed for 10 minutes. Moreover, 205 g. NaOH was added in the form of pastilles according to the following: 5 g. after 15 minutes and 10 g. after 30, 45, 60, 75, 105, 120, 135, 165, 180, 195, 225, 240, 255, 270, 285, 300, 315, 330, 345 and 360 minutes after the first addition of epichlorohydrin. After 390 minutes from the first addition of epichlorohydrin, the reaction mixture was cooled to 60°C. Then 50 ml. 4M HCl and 212 ml. 6M HCl were added while the cooling was continued to room temperature. After these additions of acid, the pH was 1.0 and the volume was 1180 ml. Subsequently, 20 ml. distilled water and 3,000 ml. ethanol (99.5%) were added with stirring, and the mixture was allowed to settle overnight. Two phases were formed. The precipitated white and crystalline solid phase was separated from the clear mother liquor by filtration and washed with 3 × 50 ml. ethanol (99.5%). The washing liquor was mixed with the filtrate, giving a total volume of 3,900 ml. Then 780 ml. (1/5 vol.) chloroform was added with vigorous stirring. After 30 minutes there was still just one phase and an additional amount of 468 ml. chloroform was added (The amount of chloroform required for obtaining two phases was determined by titration.). After 3 hours the mixture had separated into two phases. The heavy phase (vol. 500 ml.) was mixed with 250 ml. ethanol (99.5%) and with 83 ml. chloroform (1/6 vol. of 500 ml). The mixture was allowed to stand overnight whereby two phases were formed. The heavy phase (vol. 420 ml.) contained white crystals which were removed by filtration. The filtrate was mixed with 210 ml. (1/2 vol.) ethanol (99.5%) and 70 ml. (1/6 vol.) chloroform. After 2 hours the resulting heavy phase (vol. 330 ml.) was mixed with 33 ml. distilled water, 165 ml. ethanol (99.5%) and 55 ml. chloroform. After 30 minutes the resulting heavy phase (vol. 280 ml.) was separated and mixed with 14 ml. (1/20 vol.) distilled water and with 140 ml. acetone. Then it was dried in vacuum at 40°–50°C.

The yield was 162.2 g. (It is to be noted that this yield can be increased by evaporating and further treatment of the light phases.).

| Analysis: | |
|---|---|
| Weight loss at drying | 5.2% |
| Content of Na⁺ | 2.6% w/w |
| Content of Cl⁻ | 4.1% w/w |

EXAMPLE 45

The polymer of Example 44 (51 g.) and 20 ml. lactic acid were dissolved in 50 ml. distilled water. A separate solution containing 80 g. NaOH in 400 ml. distilled water was prepared. Then 40 ml. of the NaOH solution was added to the solution of polymer and lactic acid. The mixture obtained therefrom was heated to 80°C. with stirring and nine portions containing 24 ml. NaOH solution each were added subsequently. After each addition of NaOH solution was added, 14 ml. ferric chloride solution was prepared by dissolving 60 g. FeCl$_3$·6 H$_2$O in 90 ml. distilled water. The 18 portions of NaOH solution and ferric chloride solution were added over 20 minutes. Five minutes therafter 45 ml. NaOH solution was added whereafter the temperature was then kept at 80°C. for a further 25 minutes with continuous stirring. Therafter, the mixture was cooled to 25°C. and diluted to 550 ml. with distilled water. To the diluted solution were added 1,100 ml. 99.5% ethanol. After 30 minutes the mother liquor was separated from the precipitate which had formed, and the precipitate was washed with 200 ml. diluted ethanol (ethanol and water in proportion 2:1). The washed filtrate was added portionwise over 15 minutes and with vigorous stirring to 300 ml. distilled water of a temperature of 80°C. The temperature was thereafter kept at 80°C. for further 30 minutes with stirring. Thereafter, the solution was cooled to 25°C. and pH of the solution was adjusted to 6.1 with 2N HCl. The neutralized solution was filtered through Seitz No. Ko2. The solution was diluted to 400 ml. with distilled water. Then 800 ml. 99.5% ethanol was added to the diluted filtrate with vigorous stirring. After 30 minutes, the mother liquor was separated from the precipitate. The precipitate was allowed to stand for 15 hours. Thereafter the precipitate was dissolved in 250 ml. distilled water and heated to 80°C. for 30 minutes as described above. After cooling and filtering through Seitz 3/1250, the solution was diluted to 250 ml. with distilled water and 750 ml. 99.5% ethanol was added with stirring. After 20 hours the mother liquor was separated from the precipitate which had formed and the precipitate was washed twice with 100 ml. ethanol and water (proportions 2:1) and three times with 99.5% ethanol. The precipitate obtained was dried in vacuum, whereby 20.0 g. dried iron preparation containing 26.9% by weight of iron (calculated on dry preparation) was obtained.

EXAMPLE 46

The dried iron preparation obtained in Example 46 was suspended for 5 minutes at 80°C. in 90 ml. distilled water. The suspension obtained therefrom was heated in an autoclave at 120°C. for 20 minutes. Thereafter, the resulting mixture was filtered through Seitz filter plate 3/1250. The filtrate was diluted with distilled water to 90 ml. Then it was put into injection bottles which were sterilized at 120°C. during 120 minutes.

The solution obtained contained totally 47.3 mg iron/ml; had a content of 0.2 mg/ml of ferrous iron, a viscosity of 12.5 cps., a freezing point depression of 0.3°C. and a pH of 6.6. The resorption from rabbit muscle after injection of 20 mg. iron per kg. bodyweight was 82% 7 days after the injection. The excretion in rabbit urine 24 hours after the injection was 3%.

The polymer used in the present invention and the methods for the preparation thereof are further elucidated in the clauses below:

A. A physiologically innocuous, water swellable polymer with capability of forming complex with polyvalent metal cations, characterized in that it is built up of
   a. at least one hydroxy carboxylic acid selected from the group consisting of arabonic acid, gluconic acid and glucoheptonic acid and salts and lactones derivable therefrom;
   b. at least one polyhydric alcohol selected from the group consisting of glycerol, polyglycerols, tetritols, pentitols, hexitols, hepitols, with alkyl groups, containing from 1 to 5 carbon atoms partially etherified derivatives of said polyhydric alcohols, and with hydroxyalkyl groups containing from 1 to 5 carbon atoms partially etherified derivatives; and c. at least one polymerizing agent selected from the group consisting of dihalohydrins and epihalohydrins and diepoxides derivable therefrom, and mixtures thereof.

B. A polymer according to clause A, characterized in that it is built up of gluconic acid, sorbitol, and epichlorohydrin.

C. A polymer according to clause A, characterized in that it is built up of sorbitol, arabonic acid and epichlorohydrin.

D. A polymer according to clause A, characterized in that it is built up of glycerol, gluconic acid, and epichlorohydrin.

E. A polymer according to clause A, characterized in that it is built up of pentaerythritol, gluconic acid and epichlorohydrin.

F. A polymer according to clause A, characterized in that it is built up of hydroxypropylsorbitol, gluconic acid, and epichlorohydrin.

G. A polymer according to clause A, characterized in that it is built up of dulcitol, epichlorohydrin and gluconic acid.

H. A polymer according to clause A, characterized in that it is built up of mannitol, epichlorohydrin and gluconic acid.

I. A polymer according to clause A, characterized in that the average molecular weight as estimated by gel filtration is in the range from about 700 to about 5,000.

J. A polymer according to clause B, characterized in that the contents of carboxyl groups is in the range from about 0.2 to about 1.5 milliequivalents per g polymer in dried form excluding the weight of sodium and chloride present.

K. A process for the preparation of a physiologically innocuous, water swellable polymer with capability of forming complex with polyvalent metal cations, characterized by reacting in solution
  a. at least one hydroxy carboxylic acid selected from the group consisting of arabonic acid, gluconic acid and glucoheptonic acid and salts and lactones derivable therefrom;
  b. at least one polyhydric alcohol selected from the group consisting of glycerol, polyglycerols, tetritols, pentitols, hexitols, heptitols, with alkyl groups containing from 1 to 5 carbon atoms partially etherified derivatives of said polyhydric alcohols, and with hydroxyalkyl groups containing from 1 to 5 carbon atoms partially etherified derivatives of said polyhydric alcohols; and
  c. at least one polymerizing agent selected from the group consisting of dihalohydrins and epihalohydrins and diepoxides derivable therefrom; whereafter the reaction product if desired is purified by repeated precipitation and redissolution.

L. A process according to clause K wherein the reaction is carried out in alkaline aqueous solution.

M. A process according to clause K wherein the reaction is carried out at a temperature of from about 20°C to the boiling point of the reaction mixture.

N. A process according to clause K wherein the reaction is carried out at a temperature of from about 75°C to about 85°C.

O. A process according to clause K wherein the hydroxy carboxylic acid is used in the form of a lactone.

P. A process according to clause K wherein the hydroxy carboxylic acid is used in the form of an inorganic salt.

Q. A process according to clause K wherein the hydroxy carboxylic acid is used in the form of a sodium salt.

R. A process according to clause K wherein the hydroxy carboxylic acid is gluconic acid.

S. A process according to clause K wherein the hydroxy carboxylic acid is glucoheptonic acid.

T. A process according to clause K wherein the polyhydric alcohol is a hydroxy-lower alkyl hexitol.

U. A process according to clause K wherein the polyhydric alcohol is a hydroxy-lower heptitol.

V. A process according to clause K wherein the polyhydric alcohol is sorbitol.

X. A process according to clause K wherein the polymerizing agent is epichlorohydrin.

Y. A process according to any one of clauses K-X wherein gluconic acid, sorbitol and epichlorohydrin are reacted in alkaline aqueous solution and the reaction product is purified by repeated precipitation and redissolution.

Z. A process according to clause Y wherein per mole sorbitol from about 0.1 to about 1.0 moles of gluconic acid and from about 0.05 to about 5 moles of epichlorohydrin is used.

AA. A process according to clause Z wherein per mole sorbitol from about 0.2 to about 1.0 moles of gluconic acid and from about 0.1 to about 4 moles of epichlorohydrin is used.

AB. A process according to any one of clauses K-AA wherein the polymerizing agent and alkali separately are added in portions to an alkaline solution of the hydroxy carboxylic acid and the polhydric alcohol.

AC. A process according to clause AB wherein the alkali is sodium hydroxide.

AD. A process according to any one of clauses K-AC wherein the polymer product obtained is purified by repeated precipitations and redissolutions.

AE. A process according to clause AD wherein the precipitation is carried out using an organic solvent.

AF. A process according to clause AE wherein the precipitation is carried out using ethanol as precipitating agent.

AG. Modification of the process according to clause K characterized in that the hydroxy carboxylic acid and the polymerizing agent are separately reacted in acidic solution and the reaction product obtained is brought to react in alkaline solution with the reaction product of the polyhydric alcohol and the polymerizing agent.

What is claimed is:

1. An iron-containing composition suitable for parenteral administration in human and veterinary medicine consisting essentially of an aqueous solution of a complex of iron, said complex containing iron bound to a physiologically innocuous, water swellable polymer which is the reaction product (per mole of component iii below) of
  i. about 0.1 to 1.0 moles of at least one hydroxy carboxylic acid selected from the group consisting of arabonic acid, gluconic acid and glucoheptonic acid and salts and lactones derivable therefrom;

ii. about 0.05 to 5 moles of at least one polymerizing agent of the formula

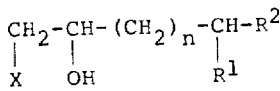  (I)

wherein *n* is an integer selected from the group consisting of 0, 1, 2, 3, and 4, X is selected from the group consisting of Cl, Br, and I; $R^1$ is selected from the group consisting of OH, Cl, Br, and I; and $R^2$ is selected from the group consisting of H, and if $R^1$ is OH also the radical $-CH_2-X$, wherein X has the meaning specified above, and diepoxides derivable therefrom; and iii. at least one polyhydric alcohol selected from the class consisting of glycerol, polyglycerols, tetritols, pentitols, hexitols, heptitols, partial alkyl ethers of said polyhydric alcohols wherein the alkyl group contains 1 to 5 carbon atoms, and partial hydroxyalkyl ethers of said polyhydric alcohols wherein the alkyl group contains 1 to 5 carbon atoms, the polymer components having been reacted in aqueous solution at a temperature between about 20°C and the boiling point of the reaction mixture.

2. An iron-containing composition according to claim 1 wherein the polymer is the reaction product of sorbitol, gluconic acid, and epichlorohydrin.

3. An iron-containing composition according to claim 1 wherein the polymer is the reaction product of sorbitol, arabonic acid and epichlorohydrin.

4. An iron-containing composition according to claim 1 wherein the polymer is the reaction product of glycerol, gluconic acid, and epichlorohydrin.

5. An iron-containing composition according to claim 1 wherein the polymer is the reaction product of pentaerythritol, gluconic acid, and epichlorohydrin.

6. An iron-containing composition according to claim 1 wherein the polymer is the reaction product of hydroxypropylsorbitol, gluconic acid, and epichlorohydrin.

7. An iron-containing composition according to claim 1 wherein the polymer is the reaction product of dulcitol, epichlorohydrin, and gluconic acid.

8. An iron-containing composition according to claim 1 wherein the polymer is the reaction product of mannitol, epichlorohydrin, and gluconic acid.

9. An iron-containing composition according to claim 1 which contains from about 5 to about 100 mg of iron per ml.

10. An iron-containing composition according to claim 9 which contains about 50 mg of iron per ml.

11. A process for the preparation of an aqueous iron-containing composition suitable for parenteral administration in human and veterinary medicine which process is characterized in that a physiologically innocuous, water swellable polymer which is the reaction product (per mole of component iii below) of i. about 0.1 to 1.0 moles of at least one hydroxycarboxylic acid selected from the group consisting of arabonic acid, gluconic acid and glucoheptonic acid, and salts and lactones derivable therefrom;

ii. about 0.05 to 5 moles of at least one polymerizing agent of the formula

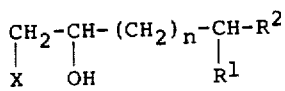  (I)

wherein n is an integer selected from the group consisting of 0, 1, 2, 3, and 4; X is selected from the group consisting of Cl, Br, and I; $R^1$ is selected from the group consisting of OH, Cl, Br, and I; and $R^2$ is selected from the group consisting of H, and if $R^1$ is OH also the radical $-CH_2-X$, wherein X has the meaning specified above, and diepoxides derivable therefrom; and iii. at least one polyhydric alcohol selected from the group consisting of glycerol, polyglycerols, tetritols, pentitols, hexitols, heptitols, partial alkyl ethers of said polyhydric alcohols wherein the alkyl group contains 1 to 5 carbon atoms, and partial hydroxyalkyl ethers of said polyhydric alcohols wherein the alkyl group contains 1 to 5 carbon atoms, is reacted with a water soluble trivalent iron compound in aqueous solution at a temperature between about 0°C to about 100°C. wherein the pH of the reaction mixture is adjusted by addition of alkali so that at the end of the reaction it is from about 10 to about 14, thereby to form said iron-containing composition.

12. A process according to claim 11, characterized in that the trivalent iron compound is reacted with a polymer which is the reaction product (per mole of component iii below) of i. about 0.1 to 1.0 moles of at least one hydroxycarboxylic acid selected from the group consisting of gluconic acid and glucoheptonic acid and salts and lactones derivable therefrom;

ii. about 0.05 to 5 moles of said polymerizing agent; and iii. at least one polyhydric alcohol selected from the group consisting of hexitols, heptitols, with alkyl groups containing from 1 to 5 carbon atoms partially etherified derivatives of hexitols and heptitols, and with hydroxyalkyl groups containing from 1 to 5 carbon atoms partially etherified hexitols and heptitols.

13. A process according to claim 11, characterized in that the trivalent iron compound is ferric chloride.

14. A process according to claim 11, characterized in that the trivalent iron compound is ferric sulphate.

15. A process according to claim 11, characterized in that the trivalent iron compound is ferric ammonium sulphate.

16. A process according to any claim 11 wherein the reaction between the ferric compound and the polymer is carried out at a pH which is successively increased to a value of about 10–14.

17. A process according to claim 11 wherein the iron complex formed is precipitated at least once with ethanol whereafter the precipitated iron complex is separated from the mixture.

18. A process according to claim 11 wherein lactic acid is incorporated in the reaction mixture.

19. A process according to claim 11 wherein the ferric compound in aqueous solution and alkali in aqueous solution are added separately to an aqueous solution of the polymer and lactic acid.

20. A process according to claim 11 wherein the alkali in aqueous solution is added to an aqueous solution containing the polymer and the ferric compound.

21. A process according to claim 11 wherein further polymer in alkaline solution is added at each redissolution of the iron complex.

* * * * *